(12) United States Patent
Velev et al.

(10) Patent No.: US 11,743,812 B2
(45) Date of Patent: Aug. 29, 2023

(54) METHODS AND APPARATUSES FOR RECONFIGURING A DATA CONNECTION

(71) Applicant: Motorola Mobility LLC, Chicago, IL (US)

(72) Inventors: Genadi Velev, Darmstadt (DE); Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/493,733

(22) Filed: Oct. 4, 2021

(65) Prior Publication Data

US 2022/0030513 A1 Jan. 27, 2022

Related U.S. Application Data

(63) Continuation of application No. 16/603,797, filed as application No. PCT/EP2017/060958 on May 8, 2017, now Pat. No. 11,140,621.

(51) Int. Cl.
| | |
|---|---|
| *H04W 48/18* | (2009.01) |
| *H04W 76/25* | (2018.01) |
| *H04W 8/18* | (2009.01) |
| *H04W 60/04* | (2009.01) |
| *H04W 84/04* | (2009.01) |

(52) U.S. Cl.
CPC ........... *H04W 48/18* (2013.01); *H04W 8/183* (2013.01); *H04W 60/04* (2013.01); *H04W 76/25* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 10,356,838 | B2 | 7/2019 | Salkintzis |
| 10,595,268 | B2 | 3/2020 | Lee et al. |
| 2012/0263051 | A1 | 10/2012 | Willars et al. |
| 2014/0119321 | A1 | 5/2014 | Wang et al. |
| 2015/0106479 | A1 | 4/2015 | He et al. |
| 2017/0142694 | A1 | 5/2017 | Yerramalli et al. |
| 2017/0303259 | A1* | 10/2017 | Lee .................. H04W 28/16 |
| 2017/0339688 | A1 | 11/2017 | Singh et al. |

(Continued)

OTHER PUBLICATIONS

Nokia et al., "Configuration aspects of Network Slicing", 3GPP TSG-RAN WG3#96 R3-171573, May 15-19, 2017, pp. 1-4.

(Continued)

*Primary Examiner* — Kenny S Lin
(74) *Attorney, Agent, or Firm* — Kunzler Bean & Adamson

(57) ABSTRACT

Apparatuses, methods, and systems are disclosed for reconfiguring a data connection using new parameters. One apparatus includes a transceiver that communicates with a UE and a processor that registers the UE with a mobile communication network using a first set of parameters, where the first set of parameters is based on a UE configuration. The processor identifies a second set of parameters to be used by the UE in the mobile communication network. Via the transceiver, the processor sends the second set of parameters to the UE and sends mapping information which indicates how the at least one parameter in the second set of parameters corresponds to at least one new parameter for the UE configuration.

20 Claims, 9 Drawing Sheets

(56) References Cited

U.S. PATENT DOCUMENTS

| | | |
|---|---|---|
| 2018/0198495 A1 | 7/2018 | Davydov |
| 2019/0021047 A1* | 1/2019 | Zong ..................... H04W 76/11 |
| 2019/0053148 A1* | 2/2019 | Lee ....................... H04W 48/18 |
| 2019/0357130 A1 | 11/2019 | Garcia Azorero et al. |
| 2019/0357131 A1 | 11/2019 | Sivavakeesar et al. |
| 2019/0373441 A1 | 12/2019 | Ryu et al. |

OTHER PUBLICATIONS

RAN3, "LS regarding RAN support for NW slicing", 3GPP TSG CT WG1 Meeting #104 C1-172109, May 15-19, 2017, pp. 1-2.

RAN3, "LS regarding RAN support for NW slicing", 3GPP TSG-RAN WG3 #95bis R3-171394, Apr. 3-7, 2017, pp. 1-2.

3GPP, "3rd Generation Partnership Project; Technical Specification Group Services and System Aspects; Procedures for the 5G System; Stage 2 (Release 15)", 3GPP TS 23.502 V0.3.0, Mar. 2017, pp. 1-115.

Samsung, "Single value of NSSAI in RRC for CCNF(AMF) selection", SA WG2 Meeting #119 S2-171153, Feb. 13-17, 2017, pp. 1-3.

Huawei, "Slice impacton mobility", 3GPP TSG-RAN WG3 95bis R3-171789, May 15-19, 2017, pp. 1-3.

3GPP, "3rd Generation Partnership Project; Technical Specification Group Services and System Aspects; Study on Architecture for Next Generation System (Release 14)", 3GPP TR 23.799 V14.0.0, Dec. 2016, pp. 1-522.

\* cited by examiner

METHODS AND APPARATUSES FOR RECONFIGURING A DATA CONNECTION

FIELD

The subject matter disclosed herein relates generally to wireless communications and more particularly relates to reconfiguring a data connection using new parameters.

BACKGROUND

The following abbreviations and acronyms are herewith defined, at least some of which are referred to within the following description.

Third Generation Partnership Project ("3GPP"), Positive-Acknowledgment ("ACK"), Access and Mobility Management Function ("AMF"), Common Control Plane Network Function ("CCNF"), Control Plane Function ("CPF"), Data Network Name ("DNN"), Downlink ("DL"), Enhanced Mobile Broadband ("eMBB"), Evolved Node B ("eNB"), European Telecommunications Standards Institute ("ETSI"), Hybrid Automatic Repeat Request ("HARQ"), Internet-of-Things ("IoT"), Internet Protocol ("IP"), Long Term Evolution ("LTE"), LTA Advanced ("LTE-A"), Medium Access Control ("MAC"), Machine Type Communication ("MTC"), Massive IoT ("mIoT"), Massive MTC ("mMTC"), Narrowband ("NB"), Negative-Acknowledgment ("NACK") or ("NAK"), Network Function ("NF"), Network Slice Instance ("NSI"), Network Slice Selection Assistance information ("NSSAI"), Network Slice Selection Function ("NSSF"), Network Slice Selection Policy ("NSSP"), Next Generation Node B ("gNB"), Non-Access Stratum ("NAS"), Primary Cell ("PCell"), Public Land Mobile Network ("PLMN"), Quality of Service ("QoS"), Radio Access Network ("RAN"), Radio Resource Control ("RRC"), Receive ("RX"), Session Management ("SM"), Session Management Function ("SMF"), Secondary Cell ("SCell"), Single NSSAI ("S-NSSAI"), Slice Differentiator ("SD"), Slice/Service Type ("SST"), Transmission Control Protocol ("TCP"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), User Plane Function ("UPF"), Universal Mobile Telecommunications System ("UMTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, network slicing allows a network operator to divide the communication network into finer, small networks optimized for certain features. A UE may be configured with network slice relevant information, such as a network slice selection policy ("NSSP"), used to select a particular network slice. During an initial UE configuration (e.g., first powering on with a new (U)SIM card), the Home Public Land Mobile Network (H-PLMN) operator can configure the UE with the NSSP policy for the HPLMN itself and for particular other PLMNs (e.g., Equivalent PLMNs or other visited PLMNs). However, a NSSP static or semi-static and becomes unsuitable if a network configuration changes, a network policy changes, or a UE subscription changes.

BRIEF SUMMARY

Methods for reconfiguring a data connection using new parameters are disclosed. Apparatuses and systems also perform the functions of the methods.

One method of a network function for reconfiguring a data connection using new parameters includes registering a UE with a mobile communication network using a first set of parameters, where the first set of parameters is based on a UE configuration. The method includes identifying a second set of parameters to be used by the UE in the mobile communication network and sending the second set of parameters to the UE. The method includes sending mapping information which indicates how the at least one parameter in the second set of parameters corresponds to at least one new parameter for the UE configuration.

One method of a UE for reconfiguring a data connection using new parameters includes registering with the mobile communication network using a first set of network slices, the first set of network slices based on a UE network slice configuration, and receiving a second set of network slices from the mobile communication network. The method includes receiving mapping information from the mobile communication network, where the mapping information indicates how each network slice in the second set of network slices maps to the UE network slice configuration, and using the mapping information to associate at least one application with a set of network slices.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
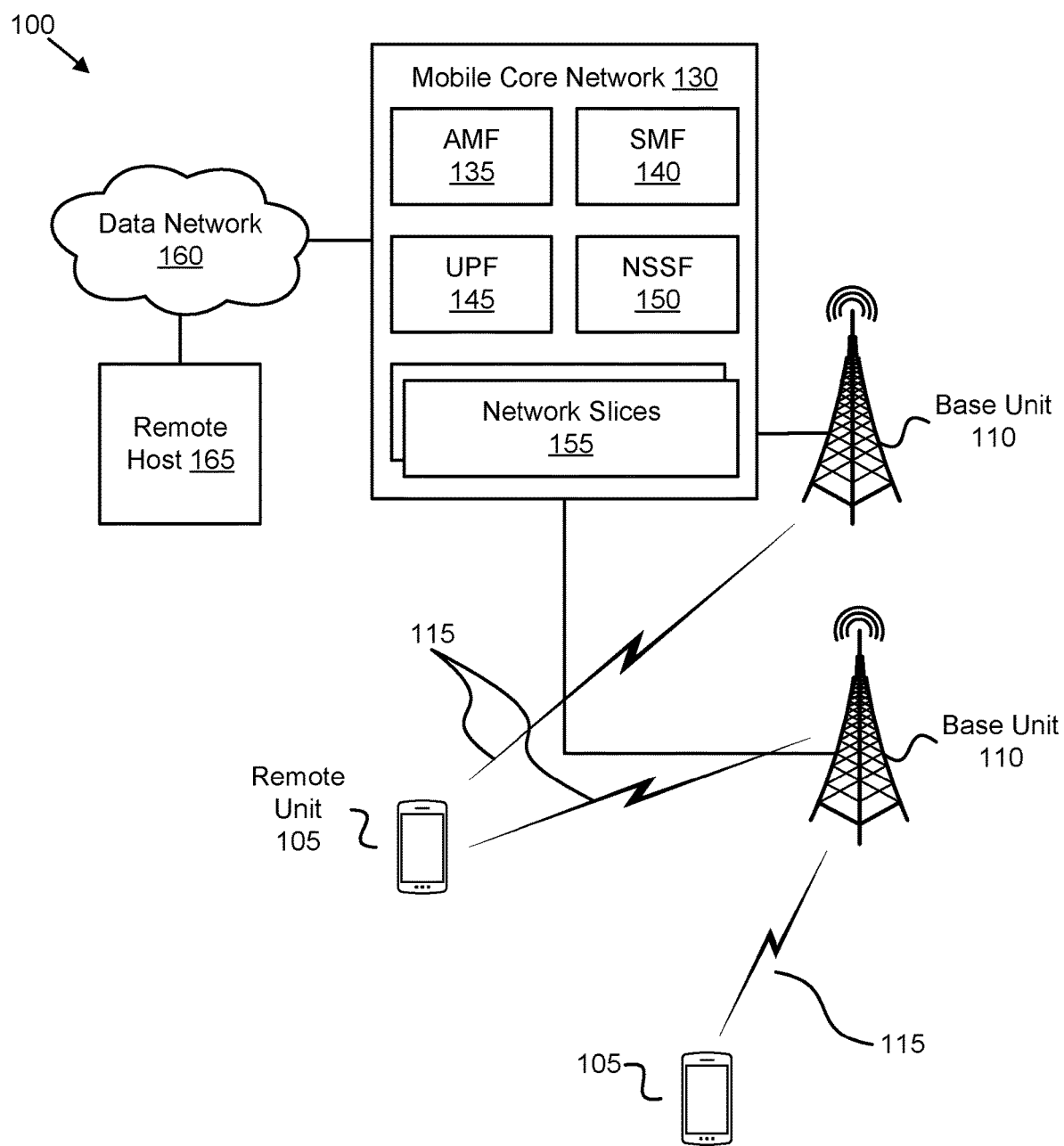
FIG. 1 is a block diagram illustrating one embodiment of a wireless communication system for reconfiguring a data connection using new parameters.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to provide dynamic NSSAI configuration in a UE, a network may determine that one or more parameters in a first set of parameters (e.g., used to register a UE and/or establish a data connection) is not valid for a current network slice instance. The network then provides a second set of parameters, whereby the UE may reconfigure its data connection and/or reregister with network. The network may also send assistance and information to indicate how the new set of parameters is to be used.

FIG. 1 depicts a wireless communication system 100 for reconfiguring a data connection using new parameters, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

The base units 110 may be distributed over a geographic region. In certain embodiments, a base unit 110 may also be referred to as an access terminal, a base, a base station, a Node-B, an eNB, a gNB, a Home Node-B, a relay node, a femtocell, an access point, a device, or by any other terminology used in the art. The base units 110 are generally part of a radio access network ("RAN") that may include one or more controllers communicably coupled to one or more corresponding base units 110. These and other elements of radio access network are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC"), which may be coupled to a data network 160, like the Internet and private data networks, among other data networks. In some embodiments, the remote units 105 communicate with a remote host 165 via a network connection with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs") and multiple network slices 155. As depicted, the mobile core network 130 includes at least one access and mobility management function ("AMF") 135, at least one session management function ("SMF") 140, at least one user plane function ("UPF") 145, and at least one network slice selection function ("NSSF") 150. Although a specific number of NFs are depicted in FIG. 1, one of skill in the art will recognize that any number of NFs may be included in the mobile core network 130.

The AMF 135 and SMF 140 are examples of control plane network functions of the mobile core network 130. Control plane network functions provide services such as UE registration, UE connection management, UE mobility management, data session management, and the like. The UPF 145 provides user plane (e.g., data) services to the remote units 105. For example, a data connection between the remote unit 105 and a remote host 165 is managed by a UPF 145.

The NSSF 150 selects a proper network slice 155 (and a network slice instance) for a particular UE connection. The NSSF 150 may be a stand-alone NF or co-located with the AMF 135 or another NF (e.g., a NRF, or a PCF). The network slices 155 are logical networks within the mobile core network 130. The network slices 155 are partitions of resources and/or services of the mobile core network 130. Different network slices 155 may be used to meet different service needs (e.g., latency, reliability, and capacity). Examples of different types of network slices 155 include enhanced mobile broadband ("eMBB"), massive machine-type communication ("mMTC"), and ultra-reliability and low latency communications ("URLLC"). A mobile core network 130 may include multiple network slice instances of the same network slice type.

As depicted, a remote unit 105 may access the mobile core network 130 (including a particular network slice 155 of the mobile core network 130) via base unit 110. However, due to its mobility, the remote unit 105 may move a portion of the network topology where prior network slice 155 instance is no longer available. Here, one or more parameters used establish a data connection (e.g., with the SMF 140) may become invalid and a data connection terminated. As described in greater detail below, the AMF 135 may communicate new parameters to the remote unit 105, wherein the remote unit 105 re-establishes the data connection using the new parameters.

Figure 2:
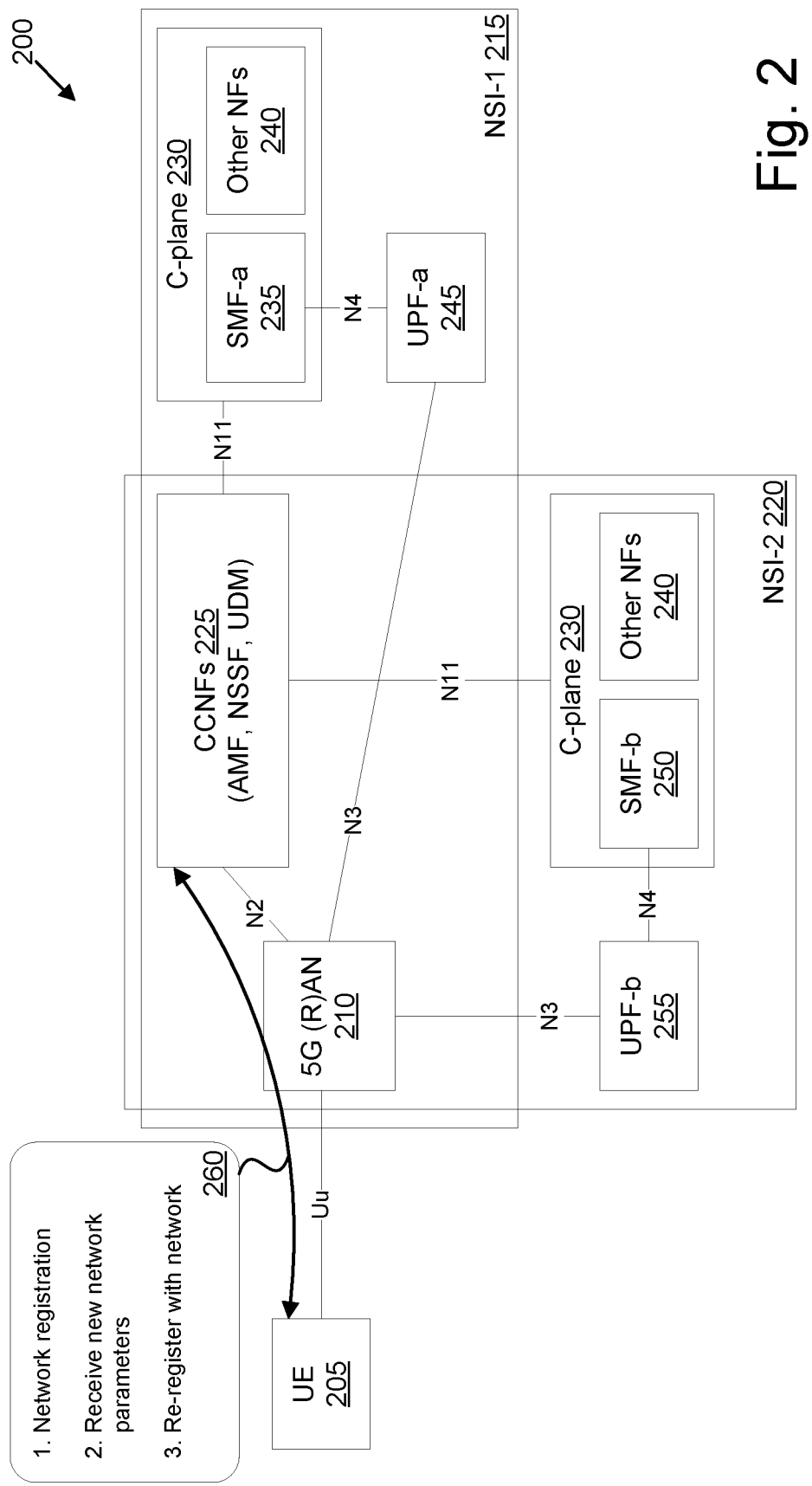
FIG. 2 is a block diagram illustrating one embodiment of a network architecture for reconfiguring a data connection using new parameters.

FIG. 2 depicts a network architecture 200 used for reconfiguring a data connection using new parameters, according to embodiments of the disclosure. The network architecture 200 may be a simplified embodiment of the wireless communication system 100. As depicted, the network architecture 200 includes a UE 205, a 5G (R)AN 210, a first network slice instance (here, "NSI-1") 215, a second network slice instance (here, "NSI-2") 220, and a set of common control plane network functions ("CCNFs") 225. The set of common control plane network functions 225 may include at least an AMF, a NSSF, and a UDM. Each network slice instance also has dedicated network functions. Here, the first network slice instance 215 includes a control plane 230 with a first SMF 235 ("SMF-a") and other dedicated network functions 240 and a first UPF 245 ("UPF-a"). Additionally, the second network slice instance 220 includes a control plane 230 with a second SMF 250 ("SMF-b") and other dedicated network functions 240 and a second UPF 255 ("UPF-b").

The UE 205 may be one embodiment of the remote unit 105 and the 5G (R)AN 210 may include one or more base units 110, as described above. The first and second network slice instances 215, 220 may be embodiments of the network slices 155. Additionally, the first and second SMFs 235, 250 and the first and second UPFs 245, 255 may be embodiments of the SMF 140 and UPF 145, respectively. The 5G (R)AN 210, the set of common control plane network functions 225, and the network slice instances 215, 220 (and their dedicated network functions) collectively form a mobile communication network with which the UE 205 communicates.

In the network architecture 200, the UE 205 may communicate with the 5G (R)AN 210 using a Uu interface, the 5G (R)AN 210 may communicate with the set of common control plane network functions 225 using an N2 interface and with the first and second UPFs 245, 255 using an N3 interface. The first SMF 235 and the first UPF 245 may communicate using an N4 interface. Likewise, the second SMF 250 and the second UPF 255 may also communicate using an N4 interface. The set of common control plane network functions 225 may communicate with the control planes 230 within the first and second network slice instances 215, 220 using an N11 interface.

The UE 205 may be configured with network slice relevant information, which is referred as Network Slice Selection Assistance information ("NSSAI"). The NSSAI may consist of single or multiple S-NSSAIs (single Network Slice Selection Assistance information). Each S-NSSAI includes a Slice/Service type ("SST," referring to expected Network Slice behavior in terms of features and services) and a Slice Differentiator ("SD," which allows further differentiation for selecting an NSI from the potentially multiple available NSIs complying with the SST).

In some embodiments, a network operator may provision the UE 205 with a network slice selection policy ("NSSP"). A NSSP includes one or more NSSP rules with each rule associating an application with a certain S-NSSAI. When an application on the UE 205 associated with a specific S-NSSAI requests data transmission, then the UE 205 sends the application's user data using a PDU session established with the S-NSSAI. In certain embodiments, the application may provide a data network name ("DNN"). In such embodiments, the UE 205 also considers the DNN when determining which PDU session (of potentially multiple PDU session established with the S-NSSAI) to use.

Multiple network slice instances ("NSIs") are deployed in the network architecture 200, including the first NSI 215 and the second NSI 220. A NSI does not necessarily cover the whole PLMN area; rather, different NSIs are deployed in different topological areas. The topological area can be expressed in means of Tracking Area ("TA," identified by a Tracking Area Identifier, "TAI") or list of Tracking Areas, or cell (identified by a cell ID) or list of cells. Generally, in a given topological network area (e.g., TA, or list of TAIs, or cell, or list of cell IDs) the configuration of deployed/instantiated NSI(s) does not change. However, in another topological area the deployed NSI may be different.

The association between S-NSSAI and NSI (in the network) is based on network configuration and deployment. Such an association between S-NSSAI and NSI can change in time based on network reconfiguration or resource optimization. Different scenarios are possible for the association/relationship between S-NSSAI and NSI. In one embodiment, there may be a one-to-one mapping between S-NSSAI and NSI. In another embodiment, there may be multiple-to-one mapping between S-NSSAI and NSI. In yet another embodiment, there may be one-to-multiple mapping between S-NSSAI and NSI.

As depicted, the UE 205 exchanges signaling 260 with the set of common control plane network functions 225 (specifically with an AMF 135 within the set of common control plane network functions 225) in order to register with the network (e.g., with a first set of one or more S-NSSAIs), received new network parameters (e.g., a new S-NSSAI), and reregister with the network (e.g., using the new S-NSSAI), as described herein. One or multiple of the NSIs serving the UE 205 may change due to several reasons (e.g., UE moving from old registration area to a new registration area or network configuration change, etc.). The UE 205 is unaware about the configuration of NSIs in the old and new registration areas. In order to inform the UE 205 of the change of NSIs, to which the UE 205 is associated, the network (e.g., an AMF in the set of common control plane network functions 225) assigns a new set of new parameters to the UE (e.g., changing the set of Allowed/Accepted S-NSSAIs) and further provides usage information that indicates to the UE 205 how to use the new set of parameters. As used herein, "usage information" refers to an indication of how the UE 205 is to use/apply the new set of parameters. "Usage information" may also be referred to herein as "mapping indication" or "NSSAI assistance information."

As discussed in further detail below, upon receiving a new set of parameters and an indication of how to use the new set of parameters (e.g., receiving usage information for the new set of parameters), the UE 205 re-registers with the set of common control plane network functions 225. Where a PDU session is established when the new set of parameters is received, then the UE 205 may also re-establish the PDU session using the new set of parameters (or establish a new PDU session using the new set of parameters).

Figure 3:
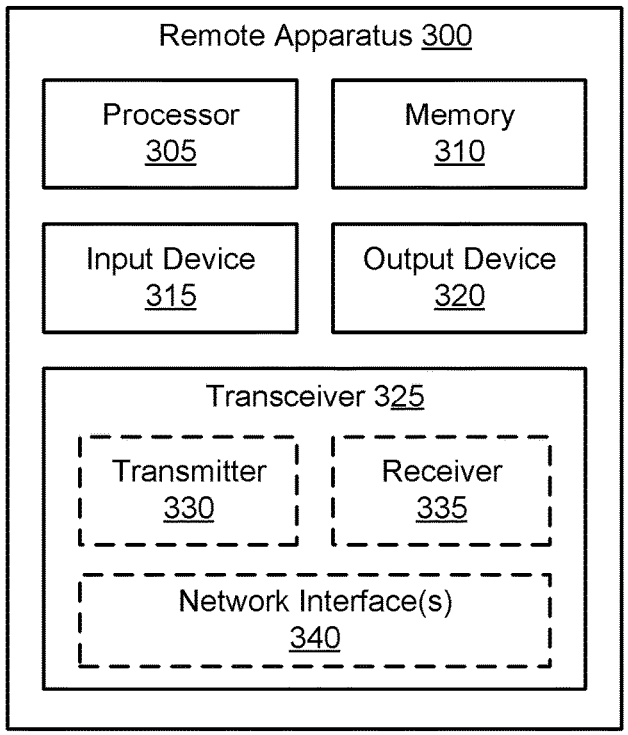
FIG. 3 is a block diagram illustrating one embodiment of a remote apparatus for reconfiguring a data connection using new parameters.

FIG. 3 depicts one embodiment of a remote apparatus 300 that may be used for reconfiguring a data connection using new parameters, according to embodiments of the disclosure. The remote apparatus 300 may be one embodiment of the remote unit 105, the relay unit 120, the remote UE 205, and/or the relay UE 210. Furthermore, the remote apparatus 300 includes a processor 305, a memory 310, an input device 315, a display 320, and a transceiver 325. In some embodiments, the input device 315 and the display 320 are combined into a single device, such as a touchscreen. In certain embodiments, the remote unit 105 may not include any input device 315 and/or display 320.

The transceiver 325 allows the remote apparatus 300 to communicate with a mobile communication network (e.g., a mobile core network 130 and/or a network slice instance 215, 220) over an access network (e.g., the base unit 110 and/or 5G (R)AN 210). The transceiver 325 may include at least one transmitter 330 and at least one receiver 335. Additionally, the transceiver 325 may support at least one network interface 340 such as a "Uu" interface used to communicate with a base unit 110 or the 5G (R)AN 210.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 establishes a data connection with the mobile communication network using a first set of parameters. Here, the first set of parameters may include a network slice selection parameter and a data network name. At some point after establishing the data connection, the processor 305 receives a second set of parameters from the mobile communication network. Along with the second set of parameters, the processor 305 receives an indication of how at least one parameter in the first set (e.g., the set used to establish the data connection) corresponds to at least one new parameter in the second set. The processor 305 also determines a third set of parameters from the first set of parameters and the second set of parameters. The processor 305 then controls the transceiver 325 to reconfigure the data connection using the third set of parameters.

In some embodiments, the processor 305 receives an indication that at least one parameter in the first set (e.g., the set used to establish the data connection) is no longer valid. For example, a message containing the second set of parameters (and the indicator of correspondence) may indicate that at least one parameter in the first set is no longer valid. In one embodiment, receiving the indication that at least one parameter in the first set is no longer valid includes the processor 305 receiving an indication that the data connection is discontinued (e.g., released).

In certain embodiments, reconfiguring the data connection may include the processor 305 re-establishing the data connection using the third set of parameters. In one embodiment, re-establishing the data connection includes the processor 305 sending a non-access stratum ("NAS") session management message that contains the third set of parameters. In a further embodiment, re-establishing the data connection includes the processor 305 sending a session management ("SM") message (e.g., a N1 Session Management Information message) encapsulated in a NAS transport message. Here, the NAS transport message contains the third set of parameters and the N1 SM message, wherein the N1 SM message includes the at least one new parameter (e.g., a new S-NSSAI) from the second set of parameters.

In certain embodiments, reconfiguring the data connection includes one of: the processor 305 re-establishing the data connection using the third set of parameters, the processor 305 establishing a new data connection using a fourth set of parameters based on the second set of parameters, and the processor 305 releasing the data connection. For example, the processor 305 may determine to release the data connection in response to determining that the third set of parameters cannot be created (e.g., results in an invalid combination/set of parameters).

In some embodiments, the first set of parameters includes a first network slice selection parameter. Here, the second set of parameters includes one or more new network slice selection parameters. In one embodiment, the processor 305 receives the indication of how the at least one parameter in the first set corresponds to at least one new parameter in the second set by receiving usage information that associates the one or more new network slice selection parameters with one or more previously provided network slice selection parameters. Here, the one or more previously provided network slice selection parameters includes the first network slice selection parameter. In certain embodiments, the processor 305 further updates a network slice selection configuration of the apparatus based on the one or more new network slice selection parameters.

In some embodiments, the processor 305 sends a registration request to update the mobile communication network with a new registration area and receives the second set of parameters in response to the registration request. In such embodiments, receiving the second set of parameters and the indication of how the at least one parameter in the first set corresponds to at least one new parameter in the second set may include the processor 305 receiving a registration accept message (e.g., a NAS Registration Accept message) that includes the second set of parameters and the indication of how the at least one parameter in the first set corresponds to at least one new parameter in the second set.

In one embodiment, receiving the second set of parameters and the indication of how the at least one parameter in the first set corresponds to at least one new parameter in the second set includes the processor 305 receiving a configuration update message. In another embodiment, receiving the second set of parameters and the indication of how the at least one parameter in the first set corresponds to at least one new parameter in the second set includes the processor 305 receiving a NAS notification message. In yet another embodiment, receiving the second set of parameters and the indication of how the at least one parameter in the first set corresponds to at least one new parameter in the second set includes the processor 305 receiving a non-access stratum ("NAS") Registration Accept message.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to reconfiguring a data connection using new parameters, for example storing NSSP, Allowed NSSAI, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with a mobile communication network via an access network (e.g., a base unit 110 and/or the 5G (R)AN 210). The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages. The transceiver 325 may include one or more transmitters 330 and one or more receivers 335 for communicating over the access network. As discussed above, the transceiver 325 may support one or more the network interfaces 340 for communicating with the mobile communication network (e.g., the base unit 110 and various network functions in the mobile core network 130).

Figure 4:
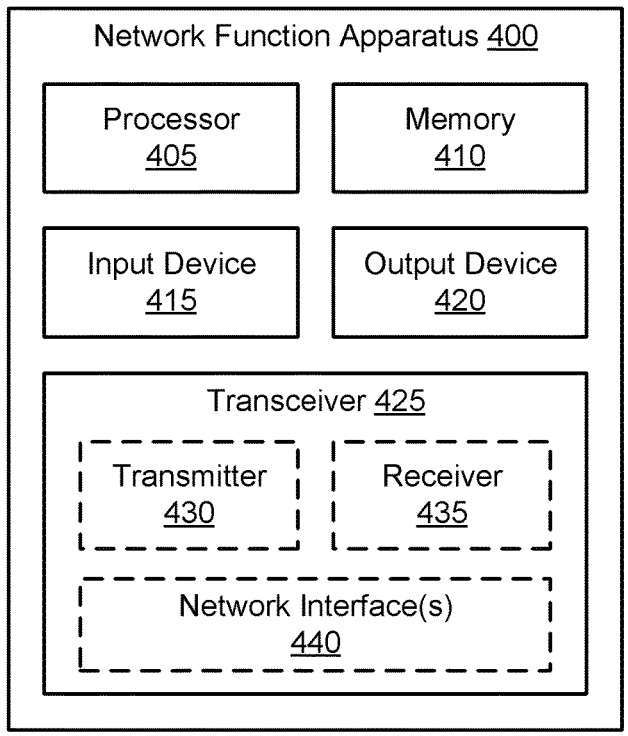
FIG. 4 is a block diagram illustrating one embodiment of a network function apparatus for re-registering the remote unit using new parameters.

FIG. 4 depicts one embodiment of a network function apparatus 400 that may be used for reconfiguring a data connection using new parameters and/or re-registering a remote unit using the new parameters, according to embodiments of the disclosure. The network function apparatus 400 may be one embodiment of the AMF 135. Furthermore, the network function apparatus 400 includes a processor 405, a memory 410, an input device 415, a display 420, and a transceiver 425. In some embodiments, the input device 415 and the display 420 are combined into a single device, such as a touchscreen. In certain embodiments, the network function apparatus 400 may not include any input device 415 and/or display 420.

The transceiver 425 allows the network function apparatus 400 to communicate with other network elements within a mobile communication network. As depicted, the transceiver 425 includes at least one transmitter 430 and at least one receiver 435. Additionally, the transceiver 425 may support at least one network interface 440 such as an "N2" interface used to communicate with a 5G (R)AN 210 and a "N11" interface used to communicate with control plane network functions, such as the SMF 140.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 registers the remote unit with a mobile communication network using a first set of parameters. Here, the processor 405 may receive an initial registration message from the remote unit, the initial registration message containing a requested set of network slice selection parameters. In such embodiments, the processor 405 may return an allowed set of network slice selection parameters to the remote unit. In certain embodiments, an allowed set of network slice selection parameters may include one or more default network slice selection parameters. Here, returning the allowed set of network slice selection parameters includes the processor sending an indication that a default network slice selection parameter corresponds to one of: a data network name and a standardized network slice type. For example, a new S-NSSAI may have an PLMN-specific SST which maps to a well-known standardized SST.

At some point in time the processor 405 identifies a second set of parameters to be used by the remote unit in the mobile communication network. Here, the second set of parameters corresponds to a change in the network slice instance ("NSI") of the remote unit. In one embodiment, the NSI changes due to mobility of the remote unit. For example, the remote unit may move to a registration area that corresponds to the new NSI (e.g., in the network topology). In another embodiment, the change in NSI may be due to a change in the subscription (e.g., plan) of the remote unit or a network policy rule applicable to the remote unit. Here, the change in subscription or policy may result in the remote unit no longer being permitted to use an old NSI. In yet another embodiment, the change in NSI may be due to a change in network slice deployment within the mobile communication network. For example, the mobile communication network may bring on-line a new network slice that serves an area where the remote unit it located.

When the NSI changes, one or more parameters in the first set of parameters may no longer be valid. In such circumstance, the processor 405 identifies the second set of parameters to be used by the remote unit in the mobile communication network and sends the second set of parameters to the remote unit with an indication of how the at least one parameter in the first set of parameters corresponds to at least one new parameter in the second set. In one embodiment, the second set of parameters includes the first set of parameters and one or more additional (new) parameters applicable to the new NSI. In another embodiment, the second set of parameters includes a subset of first set of parameters and one or more additional (new) parameters for to the new NSI that replace parameters in the first subset. In yet another embodiment, the second set of parameters may include a subset of first set of parameters without any replacement parameters. Note that the size of the second set of parameters may be larger than, smaller than, or the same size as the first set of parameters.

The indication of how the at least one parameter in the first set of parameters corresponds to at least one new parameter in the second set informs the remote unit how to use the second set of parameters based on known usage information relating to the first set of parameters. For example, if "parameter-B" in the second set corresponds to "parameter-A" in the first set, then the remote unit knows that parameter-B may be used in the same circumstances where parameter-A might be used. Here it is assumed that the remote unit already knows when to use the first set of parameters prior to receiving the indication of how the at least one parameter in the first set of parameters corresponds to at least one new parameter in the second set.

In response to sending the second set of parameters (and the indication of correspondence) the processor 405 may receive a message from the remote unit containing a third set of parameters for registering with the mobile communication network. Here, the third set of parameters is based on the first set of parameters and the second set of parameters.

In one embodiment, identifying the second set of parameters may include the processor 405 identifying the second set of parameters based on the requested set of network slice selection parameters (e.g., Requested S-NSSAIs), subscribed parameters of the remote unit (e.g., Subscribed S-NSSAIs), and/or a network slice instance associated with the remote unit. In another embodiment, identifying the second set of parameters includes the processor 405 identifying the second set of parameters based on a configuration of the remote unit and a network slice instance currently associated with the remote unit.

In some embodiments, the first set of parameters includes a first network slice selection parameter. Here, identifying the second set of parameters may include the processor 405 identifying one or more new network slice selection parameters for a network slice instance currently associated with the remote unit. Further, sending an indication of how the at least one parameter in the first set corresponds to at least one new parameter in the second set may include the processor 405 sending usage information that associates the one or more new network slice selection parameters with one or more previously provided network slice selection parameters, wherein the one or more previously provided network slice selection parameters includes the first network slice selection parameter.

In some embodiments, the processor 405 receives a registration request from the remote unit and determines that at least one parameter in a first set of parameters is no longer valid in response to the registration request. In such embodiments, sending the second set of parameters and the indication of how the at least one parameter in the first set corresponds to at least one new parameter in the second set may include the processor 405 sending a registration accept message (e.g., a NAS Registration Accept message) that includes the second set of parameters and the indication of how the at least one parameter in the first set corresponds to at least one new parameter in the second set. The processor 405 may receive the registration request in response to one of: the remote unit changing its registration area, the remote unit changing its public land mobile network ("PLMN") change, and the remote unit requiring temporarily use a network slice.

In certain embodiments, the processor 405 sends the second set of parameters and the indication of how the at least one parameter in the first set corresponds to at least one new parameter in the second set by sending one of: a configuration update message and a NAS notification message. In some embodiments, the processor 405 receives the message from the remote unit containing the third set of parameters by receiving a session management ("SM") request message encapsulated in a NAS transport message. Here, the NAS transport message contains the third set of parameters and the session management message and the SM request message includes the at least one new parameter from the second set of parameters.

In certain embodiments, the processor 405 may send a session management SM request message to a SM function in response to determining that at least one parameter in the first set is no longer valid. Here, the SM request message may include an indication to release an established data connection and a new network slice selection parameter from the second set of parameters and the at least one new parameter included in the session management message may be the new network slice selection parameter. In further embodiments, the processor 405 further receives an SM response message from the SM function, the SM response message containing a session release request message for the established data connection, with the processor 405 sending the session release request message to the remote unit.

In some embodiments, the processor 405 identifies the second set of parameters to be used by the remote unit in the mobile communication network by sending a query to a network slice selection function ("NSSF") in response to receiving a registration request from the remote unit. In such embodiments, the processor 405 may receive, from the NSSF, a mapping of network slice selection parameters to network slice instances. Here, identifying the second set of parameters further includes the processor 405 identifying a set of allowed network slice selection parameters based on a network slice instance currently associated with the remote unit. Note that the NSSF may be a standalone NF within the mobile communication network or may be a part of another NF, such as an NRF or PCF.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to reconfiguring a data connection and/or re-registering the UE using new parameters, for example storing a UE configuration, UE context, allowed NSSAI for UE, and the like. In certain embodiments, the memory 410 also stores program code and related data, such as an operating system or other controller algorithms operating on the network function apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the one or more networks functions, such as an SMF 140.

Figure 5A:
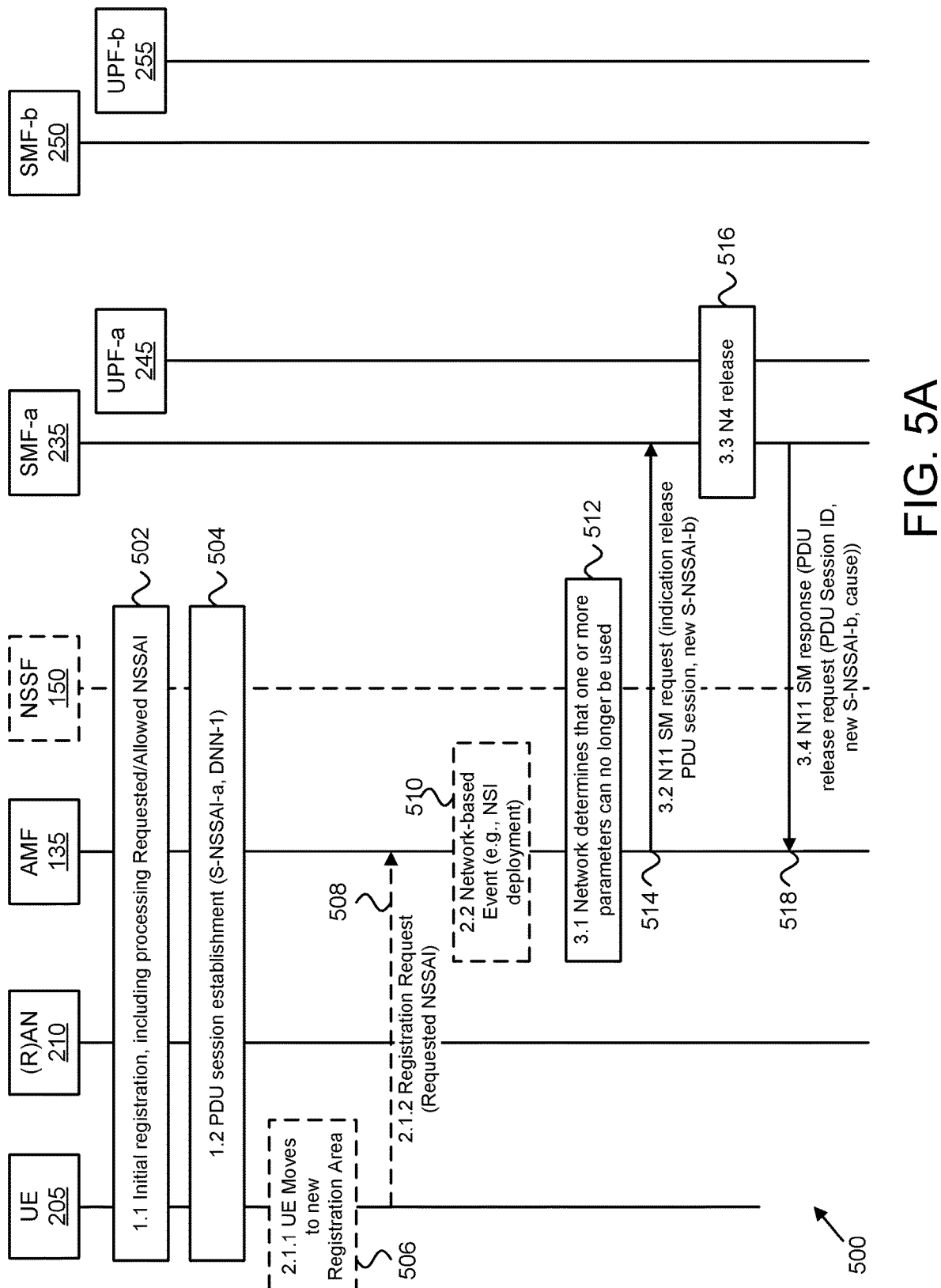
FIG. 5A is a call-flow diagram illustrating one embodiment of a network procedure for reconfiguring a data connection using new parameters.
Figure 5B:
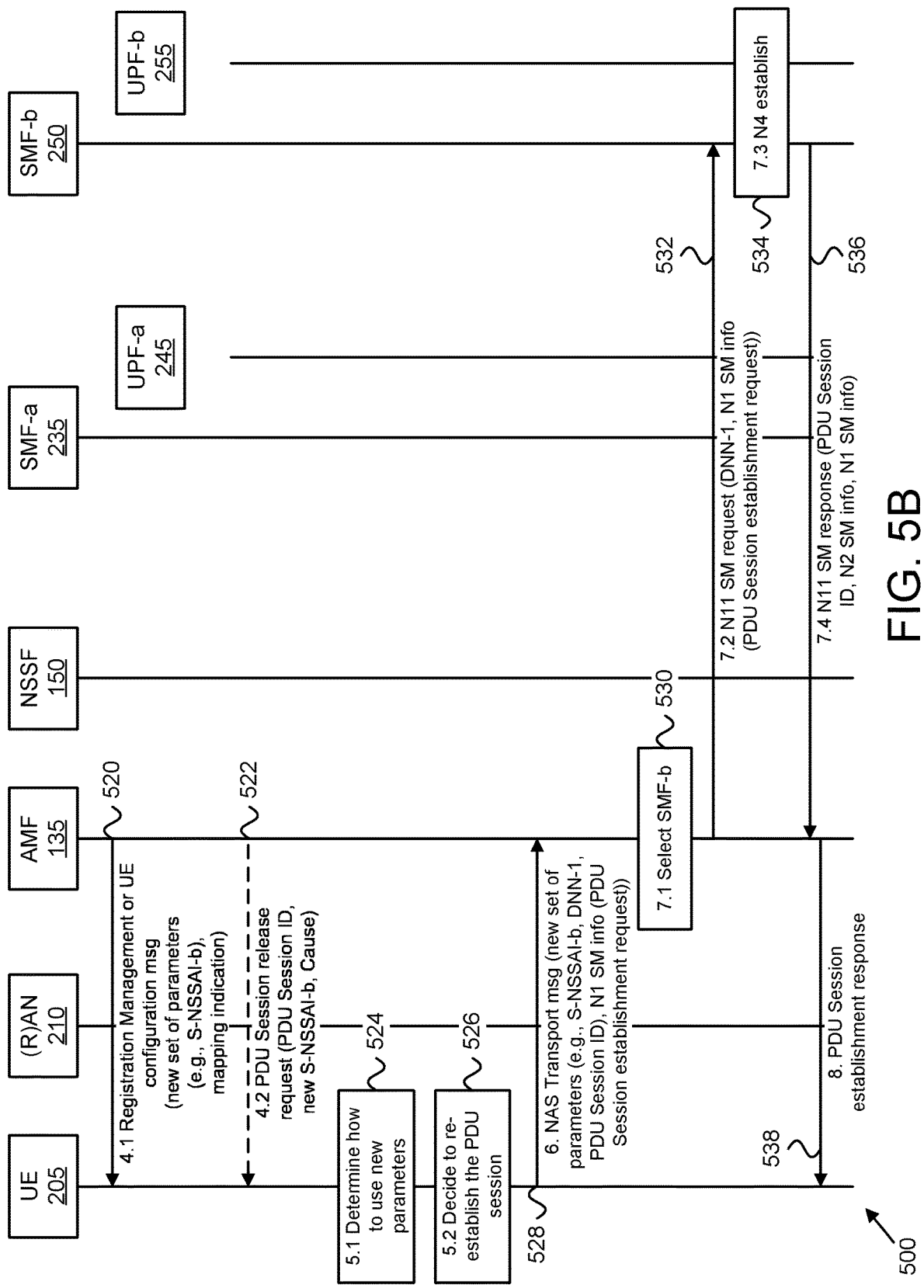
FIG. 5B is a continuation of the procedure of FIG. 5A.

FIGS. 5A and 5B depict a network procedure 500 for reconfiguring a data connection using new parameters, according to embodiments of the disclosure. The network procedure 500 begins in FIG. 5A and continues in FIG. 5B. The network procedure 500 involves the UE 205, the 5G (R)AN 210, the AMF 135, the first SMF ("SMF-a") 235, the first UPF ("UPF-b") 245, the second SMF ("SMF-b"), and the second UPF ("UPF-b"). In certain embodiments, the network procedure 500 involves the NSSF 150; however, the NSSF 150 is optional.

The network procedure 500 begins at FIG. 5A with the UE 205 performing an initial registration with the AMF 135 (see block 502). In certain embodiments, the UE 205 sends a NAS Registration Request message and receives a NAS Registration Accept message. During the Initial Registration procedure (or Attach procedure), the UE 205 registers with a particular PLMN (e.g., with the mobile communication network) and obtain services from this network. The initial registration procedure includes authenticating the UE 205, setting up required security for the control plane and user plane, and the like.

When registering with the network, the UE 205 sends a Requested NSSAI to the network. In certain embodiments, the AMF 135 (or optionally the NSSF 150) stores the Requested NSSAI in a registration management (RM) context of the UE 205. In response, the AMF 135 sends an Allowed (aka Accepted) NSSAI to the UE 205. In certain embodiments, the AMF 135 queries the NSSF 150 to determine the Allowed NSSAI for the UE 205. In some embodiments, the network (e.g., AMF 135 and/or NSSF 150) considers the configuration in the UE (e.g., Configured NSSAI per PLMN as part of the NSSP), if available, when determining the Allowed NSSAI for the UE. The set of Allowed S-NSSAIs is also stored in the AMF 135 with the UE 205's RM context.

In certain embodiments, the NSSP (e.g., Configured NSSAI in the UE) of the UE 205 is not available in the network. For example, the AMF 135 (or a PCF) may not have information about the Configured NSSAI for a roaming UE 205. As another example, the UE 205 may not send a Requested NSSAI in the NAS Registration Request message. In such embodiments, the AMF 135 includes an Allowed NSSAI including one or multiple default S-NSSAI(s) in the NAS Registration Accept message to the UE 205. In case of multiple default S-NSSAIs, the NAS Registration Accept message may include an indication (e.g., usage information) to the UE 205 how the UE should use the default Allowed S-NSSAIs. Here, the usage information (indication) may indicate, a mapping of S-NSSAI to a subscribed DNN, or mapping of the S-NSSAI's SST value to well know standardized SST values known at the UE, e.g., SST="automotive" maps to SST="V2X" because the UE does not understand "automotive" but does understand "V2X".

For example, the AMF 135 may determine the need to send the additional indication for the use of Allowed S-NSSAI (e.g., mapping of S-NSSAI to DNN) where a V-PLMN uses operator-specific values for the SST part of the S-NSSAI. As another example, the AMF 135 may determine the need to send the additional indication for the use of S-NSSAI where there are multiple S-NSSAIs having the same SST type and the SD parts might be ambiguous in the UE 205. In yet another example, the usage information indicates that the Allowed S-NSSAI (SST="automotive", SD="Mercedes") maps to the Requested S-NSSAI (SST="V2X", SD="BMW"), or Allowed S-NSSAI (SST="automotive", SD="car") maps to the Requested S-NSSAI (SST="V2X", SD="Mercedes"). The latter example shows 1-to-1 mapping. In still another example the mapping indication may be in 1-to-Many format, for instance Allowed S-NSSAI (SST="automotive", SD="car") maps to Requested S-NSSAI (SST="V2X", SD="Mercedes") and Requested S-NSSAI (SST="mIoT", SD="Mercedes"). Please note that SST values, e.g. "V2X" or "automotive" or "mIoT", can be represented by numerical values, e.g. "001", "002", in the protocol implementation. Similar applies to the SD values, e.g. "car" or "Mercedes", which can be represented also by numerical values.

After registering with the network, the UE 205 establishes a PDU session in order to send/receive data (e.g., IP data or non-IP data) via the mobile communication network (see block 504). Here, the PDU session is established using a first set of parameters (e.g., S-NSSAI, DNN, SSC Mode, PDU Type, etc.). For example, the first set of parameters may include: [S-NSSAI-a, DNN-1, SSC1, PDU IP type, etc.].

Here, "S-NSSAI-a" is a first S-NSSAI that contains particular values for the [SST; SD] combination. In response to a PDU session establishment request with the first set of parameters, the AMF 135 and/or NSSF 150 assigns the NSI to be used for this particular PDU session. In the depicted embodiment, the assigned NSI includes the first SMF 235 and the first UPF 245 to serve the PDU session of the UE 205. Referring back to FIG. 2, here the assigned NSI is the first NSI 215.

Referring again to FIG. 5A, at some point in time an event occurs which renders one or more of the parameter in the first set of parameters to become unavailable. The event may occur when the UE 205 is in a Connected state (e.g., CM-CONNECTED) or in an Idle state (e.g., CM-IDLE). In certain embodiments, the event is initiated by the UE 205. For example, the UE 205 may move to a new registration area (see block 506) which does not support all of the parameters in the first set (e.g., does not support the S-NSSAI-a) and the UE 205 sends a Registration Request to update the network with its new registration area (see signaling 508). Here, the Registration Request includes the aforementioned Requested NSSAI. As another example, the UE 205 may move to a new PLMN which does not support all of the parameters in the first set (e.g., does not support the S-NSSAI-a).

In other embodiments, the event which renders the one or more parameters unavailable is a network-initiated event (see block 510). For example, a subscription of the UE 205 may change, where the new subscription does not allow the use of one or more parameters in the first set (e.g., does not support the S-NSSAI-a). As another example, a network policy applicable to the UE 205 may change, where the new policy does not allow the UE 2052 use one or more parameters in the first set (e.g., does not support the S-NSSAI-a). In yet another example, the deployment of NSIs may change, where the new deployment does not support one or more parameters in the first set (e.g., does not support the S-NSSAI-a).

In response to the event, the AMF 135 (and/or together with the NSSF 150) determines that one or more parameters in the first set of parameters used to establish the PDU session cannot be used anymore (see block 512). In doing so, the AMF 135 (and/or together with the NSSF 150) determines a Modification of the Set of Network Slice(s) for a UE (e.g., for the UE 205). For example, the AMF 135 may determine that S-NSSAI-a cannot be used in the new registration area of the UE 205. In certain embodiments, the UE 205's data connection (PDU session) may be discontinued (e.g., released) as a result.

In some embodiments, the network determines that the set of network slices with which the UE 205 is currently associated is modified. This determination may happen in a single NF (e.g., the AMF 135) or in multiple NFs (including, e.g., the AMF 135, the NSSF 150, a PCF, a NRF, and the like). In one embodiment, this determination considers the configuration of the UE 205 (e.g., the Configured NSSAI per PLMN as part of the NSSP of the UE 205). In another embodiment, this determination considers the Requested NSSAI stored the RM context of the UE 205 (if available). In yet another embodiment, the determination considers both the configuration of the UE 205 and the requested NSSAI.

If the network determines that one or multiple of the Allowed S-NSSAIs may not be known in the UE 205, the serving PLMN provides additional information how the new Allowed NSSAI is used in the UE 205 (e.g., providing usage information mapping the new Allowed S-NSSAI(s) to corresponding old Allowed S-NSSAI(s) or to corresponding old Requested S-NSSAI(s)). The network (e.g., the AMF 135 and/or together with the NSSF 150) determines that one or multiple of the new Allowed S-NSSAIs may not be known in the UE 205 based on the following mechanism.

The AMF 135 stores the Requested NSSAI from the initial Registration procedure and, together with the subscribed NSSAI, the AMF 135 determines whether a particular new Allowed S-NSSAI to be provided to the UE 205 is known in the UE 205 (e.g., whether a particular Allowed S-NSSAI is part of the UE 205's Configured NSSAI for this serving PLMN). Please note that in the serving PLMN, the set of Allowed S-NSSAIs provided to the UE 205 may change after the time of registration (e.g., due to UE mobility or changing network configuration). The network (e.g., the AMF 135 and/or together with the NSSF 150) determines the set of the Allowed S-NSSAIs based on the full set of the Requested S-NSSAIs and the subscribed S-NSSAIs. Please also note that one or multiple of the provided set of Allowed S-NSSAI(s) can have PLMN-specific SST values or SD values, which are unknown in the UE 205, as e.g., those S-NSSAI(s) are not part of the Configured S-NSSAI for this PLMN.

In certain embodiments, the network determines that the NSI to which the UE 205 is associated changes, but that there is no need for NSSAI re-configuration in the UE 205. For example, there may be no change to the set of Allowed S-NSSAIs which have been provided to the UE despite the change in NSI.

In some embodiments, the AMF 135 sends to the first SMF 235 (e.g., SMF-a) an N11 SM Request message including a trigger to initiate a PDU Session Release procedure (see signaling 514). In certain embodiments, the AMF 135 includes (among other N11 parameters used to identify the N11 signaling transaction itself, e.g., including AMF ID or SMF ID or other transaction IDs) the new S-NSSAI (e.g., S-NSSAI-b) to be used by the UE 205 when the UE 205 re-establishes the PDU session. Here, the AMF 135 determines whether to include the new S-NSSAI in the N11 SM Request message based on a need to change Allowed S-NSSAIs configured in the UE 205. Considering the set of stored Allowed S-NSSAIs, the AMF 135 (and/or with NSSF 150) can determine whether the UE 205 may continue to use the same set of Allowed S-NSSAIs indicated during initial registration. In some embodiments, however, the previously established PDU session may need to be reestablished due to the NSI change (e.g., due to one or more parameters used to establish the PDU session becoming unavailable/invalid). For example, the AMF 135 may determine that the set of stored Allowed S-NSSAIs does not change; however, the established PDU session may still need to be re-established with another S-NSSAI which is part of the set of stored Allowed S-NSSAIs due to the change in NSI.

In response to the N11 SM Request message, the first SMF 235 initiates an N4 release procedure with the first UPF 245 (e.g., UPF-a) in order to release the user plane resources (see block 516). After the N4 release procedure, the first SMF 245 generates and sends an N11 SM Response message to the AMF 135 (see signaling 518). Here, the N11 SM Response message includes N11 information to be used in the AMF 135 to identify the N11 signaling transaction itself, (e.g., including AMF ID or SMF ID or other transaction IDs) and an N1 SM Information container that contains a PDU Session Release Request message. The PDU Session Release Request message contains the PDU Session ID (and other parameters for identifying the PDU session at the UE 205), and in addition a new set of parameters (e.g., S-NSSAI-b) and an appropriate Cause value for the PDU Session release indicating to the UE 205 that e.g., the PDU session can be re-established with the new set of parameters (e.g., new S-NSSAI-b).

Referring now to FIG. 5B, when the AMF 135 (and/or NSSF 150) determines that a change of the set of Allowed S-NSSAIs associated with the UE 205 is needed, there are several situations which may occur about the modification of the Set of Network Slice(s) for a UE (e.g., the UE 205).

In a first embodiment, a Network Slice instance (NSI) becomes no longer available to the UE 205 (e.g., due to the change of set of NSIs for the UE). Here, the Network Slice instance corresponds to an S-NSSAI which is part of the old Allowed NSSAI. In such an embodiment, the AMF 135 initiate, e.g., a Registration Management procedure or UE Configuration Update procedure to send a new Allowed NSSAI which does not contain the unavailable old S-NSSAI (see signaling 520). The UE 205 determines how to use the new parameters based on usage information included with the new parameters (see block 524). In addition, the network initiates PDU Session Release procedure and indicates that the PDU Session(s) are released due to no longer available associated S-NSSAI (see signaling 522). In one embodiment, the UE 205 may re-establish the PDU Session with another default S-NSSAI part of the allowed NSSAI (see block 526, signaling 528). In another embodiment, the UE 205 releases the PDU session and does not initiate PDU Session establishment while the associated S-NSSAI(s) are not part of the Allowed NSSAI.

In a second embodiment, a new, additional Network Slice instance becomes available to the UE 205 (e.g., due to the change of the set of NSIs for the UE). Here, the new Network Slice instance corresponds to a new S-NSSAI which is not a part of the Allowed NSSAI in the UE 205. In such an embodiment, the AMF 135 may initiate, e.g., a Registration Management procedure or UE Configuration Update procedure to send a new Allowed NSSAI which contains the new additional S-NSSAI (see signaling 520). The UE 205 determines how to use the new parameters based on usage information included with the new parameters (see block 524). Based on UE configurations (e.g., NSSP policies), the UE 205 may initiate a PDU Session release and re-establishment procedures to associate existing PDU Session(s) with the new S-NSSAI, i.e. with the existing PDU Session(s) are established over the new Network Slice instance (see block 526, signaling 528).

In a third embodiment, a new Network Slice instance corresponding to a S-NSSAI which is already a part of the Allowed NSSAI becomes available to the UE 205 (e.g., due to the change of the set of NSIs for the UE), where the new NSI replaces an old NSI used by the UE 205. Here, the network does not need to assign a new Allowed NSSAI to the UE 205. However, the network (e.g., the SMF 235 based on a corresponding trigger from the AMF 135 in signaling 514) initiates a PDU Session Release procedure for the PDU Session(s) associated with the impacted S-NSSAI. The PDU Session release request message contains an appropriate Cause value (e.g., indicating NSI change) and with an indication of the possibility of re-establishment. Where so indicated, the UE 205 may re-establish the PDU Session(s) using the same S-NSSAI and the PDU Session will be established over the new Network Slice instance.

In a fourth embodiment, a new Network Slice instance corresponding to a S-NSSAI which is not a part of the Allowed NSSAI becomes available to the UE 205 due to the change in NSI, where the new NSI replaces an old NSI used by the UE 205. In such an embodiment, the AMF 135 may initiate, e.g., a Registration Management procedure or UE Configuration Update procedure to send a new Allowed NSSAI which contains the new S-NSSAI and indicates that the new S-NSSAI is a replacement to an old S-NSSAI (see signaling 520). The network (e.g., the SMF 235 based on a corresponding trigger from the AMF 135 in signaling 514) also initiates a PDU Session Release procedure for the PDU Session(s) associated with the old S-NSSAI (see signaling 522). The UE 205 determines how to use the new parameters based on usage information included with the new parameters (see block 524). In certain embodiments, the SMF 235 indicates that the PDU Session re-establishment should be performed with the new S-NSSAI (see block 526). In such embodiments, the UE 205 re-establishes the PDU Session(s) associated with the old S-NSSAI using the new S-NSSAI (see signaling 528).

In the first, second, and fourth embodiments above, the AMF 135 sends to the UE 205 a new (second) set of parameters to be used after determining that one or more parameters in the first set cannot be used anymore (see signaling 520). In addition to the second set of parameters, the network may also send an indication of how a parameter in the first set can be mapped to a parameter in the second set. This is the usage information discussed above, and the UE 205 determines how to use the new parameters from the usage information (see block 524).

The NAS signaling from the network (e.g., AMF 135) to the UE can be performed within different NAS procedures. If the event for NSI reconfiguration is triggered based on a UE-initiated Registration, then the AMF 135 may use a NAS Registration Accept message to convey the second set of parameters (and usage information). Otherwise, if the event for NSI reconfiguration is network-initiated (e.g., due to deployment of network slice instances changes or UE subscription changes), then the AMF 135 may use a NAS UE Configuration Update procedure, a NAS Notification procedure, or any other NAS procedure for UE parameters configuration update. In this scenario, a NAS procedure triggered by the network is used to update/modify the configuration/parameters of the UE 205.

In one example, the UE 205 receives a NAS Registration Accept message or a NAS Notification message which includes a second set of NSAAI parameters (e.g., S-NSSAI-b), and usage information (e.g., mapping information) that maps S-NSSAI-b to S-NSSAI-a (see signaling 520). In another example, the UE 205 receives a NAS Registration Accept message or a NAS Notification message that carries the second set of NSSAI parameters including [S-NSSAI-b, 5-NSSAI-c] and the usage information indicates that [S-NSSAI-b can be mapped to S-NSSAI-a]. Here, S-NSSAI-c may be a previously Allowed S-NSSAI or may be a new S-NSSAI which does not replace a part of the previously Allowed NSSAI.

In certain embodiments, the UE 205 sends in a NAS Registration Request message that includes the Requested NSSAI parameter [S-NSSAI-a, S-NSSA-c] (refer to signaling 508). Here, the AMF 135 may determine that the network cannot serve [S-NSSAI-a, S-NSSA-c] due to the change in NSI (refer to block 512). In response, the AMF 135 may send a NAS Registration Accept message with the new Allowed NSSAI [S-NSSAI-x, S-NSSA-y] and usage information for mapping the new Allowed NSSAI to the old Allowed NSSAI. For example, the usage information may indicate that, e.g., S-NSSAI-x maps to S-NSSAI-a, and S-NSSA-y maps to S-NSSAI-c. In the case of operator-specific SST values, the usage information may indicate how the SST values in the set of new Allowed S-NSSAI is mapped to a standard SST value or how the SST values in the set of new Allowed S-NSSAI is mapped an SST value from a Requested S-NSSAI (e.g., SST from S-NSSAI-x is to be used as the standardized SST value "eMBB").

Note that the AMF 135 may send a NAS message carrying a PDU session release request to the UE 205 (see signaling 522), where the PDU session release request is from a NAS Session Management (SM) message originated at the first SMF 235. Here, the AMF 135 may receive the PDU session release request encapsulated within a NAS SM message (e.g., as shown in signaling 518). In certain embodiments, the AMF 135 sends the SM PDU Session Release Request message encapsulated in a NAS Registration Accept or encapsulates it in a NAS Notification/Transport message (e.g., encapsulated as N1 SM Information container parameter). Here, the N1 SM Information container includes a PDU Session Release Request message containing A) a proper release Cause value indicating a change of network configuration/slices and B) either an existing old S-NSSAI or a new S-NSSAI.

Based on the received signaling from the network, the UE 205 determines which actions to take. Where a NSI corresponding to an S-NSSAI which is part of the old allowed NSSAI becomes no longer available, then the UE 205 may release the PDU Session associated with the S-NSSAI which is no longer available. Thereafter, the UE 205 decide to re-establish the PDU Session with another default S-NSSAI part of the allowed NSSAI and according to the NSSP configuration (see block 526).

If, however, the S-NSSAI(s) associated with the released PDU Session are not part of the new Allowed NSSAI, then the UE 205 refrains from the corresponding application(s) until a new configuration from the network is performed (e.g., either a new NSSP configuration or a new Allowed NSSAI configuration) which would allow the establishment of the corresponding data connections (e.g., PDU Sessions). Accordingly, the UE 205 does not re-establish the released PDU session until the Allowed NSSAI does not contain an S-NSSAI associated with the application(s).

Where there is a new, additional NSI corresponding to an S-NSSAI which is not part of the of the old allowed NSSAI, then the UE 205 may initiate a PDU Session release procedure and PDU Session re-establishment procedure to associate existing PDU Session(s) with the new S-NSSAI based on UE configurations (e.g., NSSP policies) the UE 205. Accordingly, the PDU Session(s) are moved from one old NSI to a new NSI. In certain embodiments, the UE 205 may also initiate the establishment of new PDU Session(s) with a new particular S-NSSAI, for example in the case that there is configuration in the UE to use the PDU session with the new S-NSSAI.

Where there is a new NSI corresponding to an S-NSSAI which is already a part of the old allowed NSSAI and the new NSI replaces an old NSI used by the UE 205, then the UE 205 does not change its NSSAI configuration. However, based on the PDU Session release procedure (e.g., based on the Release Cause in the PDU Session Release Request message), the UE 205 determines that the already established PDU Session may be re-established with the same S-NSSAI value (see block 526). Here, the UE 205 may release the established PDU session and initiate a PDU Session establishment procedure with the same S-NSSAI value.

Where there is a new NSI corresponding to an S-NSSAI which is not a part of the old allowed NSSAI and the new NSI replaces an old NSI used by the UE 205, then the UE 205 determines a third set of parameters from the first set of parameters and the second set of parameters using the usage information. Here, the UE 206 determines how to use the new set of parameters signaled (see block 524). In one embodiment, the UE 205 stores the new second set of parameters including the usage information (e.g., mapping information). In certain embodiments, the UE 205 updates its NSSAI-related configuration based on the usage information.

As depicted in FIG. 5B, the third set of parameters contains [S-NSSAI-b, DNN-1], where internally the UE 205 maps S-NSSIA-a to S-NSSAI-b for this registration area (or this PLMN). In some embodiments, the third set of parameters is equal to the second set of parameters.

The UE 205 then re-establishes the data connection using the third set of parameters (or initiates a new data connection using a fourth set of parameters based on the second set of parameters). Here, it is assumed that the UE 205 successfully completed the NAS Registration procedure (Mobility management procedure) with the network. To re-establish the data connection, the UE 205 initiates NAS Session Management signaling towards the network (e.g., towards an SMF).

The NAS SM signaling message (referenced as N1 SM Information) is encapsulated in another NAS message terminated at the AMF 135 (e.g., the NAS Transport message). In certain embodiments, the NAS message terminated at the AMF 135 contains both a new PDU Session ID and an old PDU Session ID in order to allow the AMF 135 to make the association between the old PDU Session (which was terminated) and the new requested PDU session. The new (third) set of parameters can be optionally included in the PDU Session Establishment Request from the UE 205 to the second SMF 250 (e.g., SMF-b).

As depicted, the UE 205 may send a NAS session management message, such as the depicted NAS Transport message, that includes the third set of parameters (e.g., S-NSSAI-b, DNN-1, PDU Session ID, etc.) and the N1 SM Information embedding the PDU Session establishment request (e.g., containing the new S-NSSAI, SSC mode, PDU type, etc.) (see signaling 528). Here, the new set of parameters may be included in the NAS message targeted to the AMF 135 (e.g., to be processed in the AMF 135), but also the new set of parameters can be included in the N1 SM Information container targeted to the new SMF (e.g., the second SMF 150) which is transparent to the AMF 135.

The AMF 135 processes the NAS message (e.g., NAS Transport message) from the UE 205. Based on the new PDU Session ID, the new S-NSSAI information (e.g., S-NSSAI-b), DNN-1 information, and other parameters, the AMF 135 selects a SMF to serve the PDU Session, e.g., the AMF 135 may select a new SMF (see block 530), but also may select the SMF-a 235 if the new NSI characterized by the new S-NSSAI is served by SMF-a 235. As depicted, the AMF 135 selects the second SMF 250 ("SMF-b"). After selecting the SMF to serve the PDU Session, the AMF 135 forwards the NAS SM message to the selected second SMF 250 (see signaling 532). As depicted, the AMF 135 may send a N11 SM request message that contains the PDU Session ID and the N1 SM information embedding the PDU Session Establishment Request. Note that the PDU session establishment request includes the new S-NSSAI-b, DNN-1, SSC1, PDU type, etc.

The second SMF 250 processes the NAS SM message and selects an appropriate UPF (here, the second UPF 255). After selecting the new UPF, the second SMF 250 establishes the N4 association with the second UPF 255 and configures the second UPF 255 correspondingly (see block 534). After establishing the N4 association, the second SMF 250 generates and sends to the AMF 135 an N11 SM response message including PDU Session ID, N2 SM Information (e.g., PDU Session ID, QoS profiles(s), UP tunnel Info, etc.), N1 SM Information (e.g., PDU Session Establishment Accept (IP configuration info (IP prefix/address), Authorized QoS Rule(s), S-NSSAI, NSSAI assistance information, SSC mode, etc.), and other parameters.

The second SMF 250 sends the N11 message to the AMF 135 (see signaling 536) and the AMF 135 forwards the N2 SM information to the (R)AN and the N1 SM Information to the UE (see signaling 538). The usage information (e.g., NSSAI assistance information) in the N1 SM information (e.g., PDU Session Establishment Accept) message may be the same or different from the usage information provided in the NAS Registration/Mobility signaling (refer to signaling 520). For example, the usage information in the N1 SM information message may indicate to the UE 205 which (additional) application IDs can be used with the S-NSSAI from the PDU Session Establishment Accept message.

In some embodiments, the NSSF 150 is responsible for the association of the UE 205 with a particular set of NSIs. For example, in a given registration area, the NSSF 150 may determine to which NSI a particular S-NSSAI maps. Here, the NSSF 150 is responsible for the association between S-NSSAI and NSI. Accordingly, the AMF 135 may consult the NSSF 150 when the UE 205 performs a Registration procedure (with or without Requested NSSAI). Here, the AMF 135 requests the NSSF 150 to determine which NSI(s) to use for the UE 205 for the set of Allowed NSSAIs.

In certain embodiments, each NSI is identified by an Identifier (e.g., NSI-ID) which may be used by the network internally, but not exposed to the UE 205. Here, when the AMF 135 receives a new NAS Registration Request from the UE 205, the AMF 135 derives a "preliminary set" of Allowed S-NSSAIs based on the set of Requested S-NSSAIs and UE 205's subscription information. Then the AMF 135 sends this "preliminary set" of Allowed S-NSSAIs to the NSSF 150 to request possible NSIs to be used in this registration area. In response, the NSSF 150 determines the NSIs based on the "preliminary set" of Allowed S-NSSAIs and the actual Network Slice deployment configuration in this area. In certain embodiments, the NSSF 150 determines that two S-NSSAIs from the "preliminary set" of Allowed S-NSSAIs are mapped to the same NSI. The NSSF 150 returns to the AMF 135 the mapping of S-NSSAIs to NSI-IDs. Based on this information, the AMF 135 derives the "actual set" of Allowed S-NSSAIs to be transmitted to the UE 205.

Figure 6:
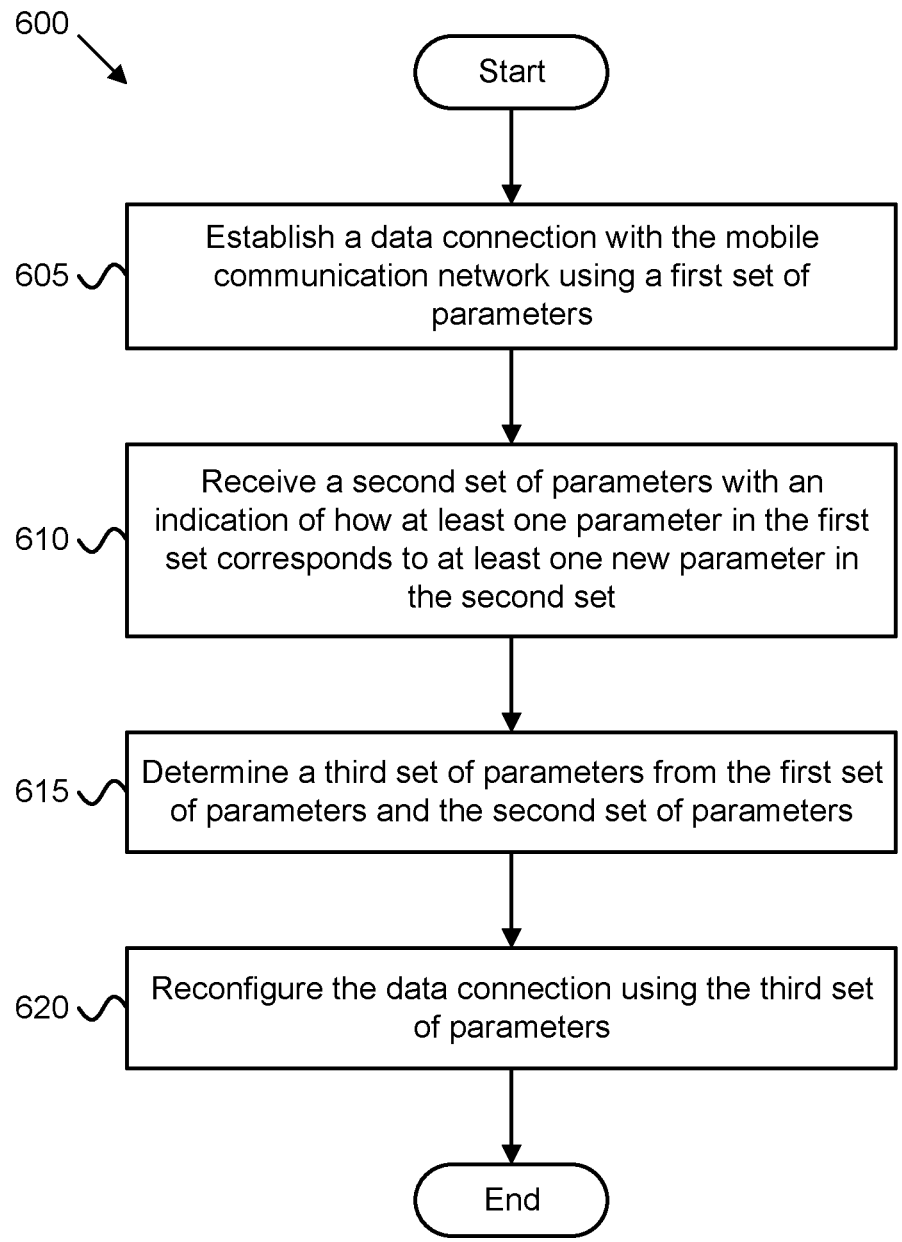
FIG. 6 is a flow diagram illustrating one embodiment of a method reconfiguring a data connection using new parameters.

FIG. 6 depicts a method 600 for reconfiguring a data connection with new parameters, according to embodiments of the disclosure. In some embodiments, the method 600 is performed by an apparatus, such as the remote unit 105, the UE 205, and/or the remote apparatus 300. In certain embodiments, the method 600 may be performed by a processor executing program code, for example, a microcontroller, a microprocessor, a CPU, a GPU, an auxiliary processing unit, a FPGA, or the like.

The method 600 begins and establishes 605 a data connection with a mobile communication network using a first set of parameters. In one embodiment, the first set of parameters includes a network slice selection parameter and a data network name.

The method 600 includes receiving 610 a second set of parameters from the mobile communication network and an indication of how at least one parameter in the first set of parameters (e.g., the set used to establish the data connection) corresponds to at least one new parameter in the second set. In some embodiments, the first set of parameters includes a first network slice selection parameter. In such embodiments, the second set of parameters includes one or more new network slice selection parameters.

In some embodiments, receiving 610 the indication of how the at least one parameter in the first set corresponds to at least one new parameter in the second set includes receiving usage information that associates the one or more new network slice selection parameters with one or more previously provided network slice selection parameters. Here, the one or more previously provided network slice selection parameters includes the first network slice selection parameter. In certain embodiments, receiving 610 the second set of parameters includes updating a network slice selection configuration of a remote unit based on the one or more new network slice selection parameters.

In some embodiments, receiving 610 the second set of parameters includes receiving an indication that at least one parameter in the first set (e.g., used to establish the data connection) is no longer valid. In one embodiment, receiving 610 the indication that at least one parameter in the first set is no longer valid includes receiving an indication that the data connection is discontinued (e.g., released).

In certain embodiments, receiving 610 the second set of parameters occurs in response to sending a registration request to update the mobile communication network with a new registration area. In one embodiment, receiving 610 the second set of parameters and the indication of how the at least one parameter in the first set corresponds to at least one new parameter in the second set includes receiving a configuration update message. In another embodiment, receiving 610 the second set of parameters and the indication of how the at least one parameter in the first set corresponds to at least one new parameter in the second set includes receiving a NAS notification message. In yet another embodiment, receiving 610 the second set of parameters and the indication of how the at least one parameter in the first set corresponds to at least one new parameter in the second set includes receiving a NAS Registration Accept message.

The method 600 includes determining 615 a third set of parameters from the first set of parameters and the second set of parameters. In one embodiment, determining 615 the third set of parameters from the first set of parameters and the second set of parameters includes replacing at least one invalid parameter in the first set with at least one corresponding parameter in the second set to form the third set of parameters.

The method 600 includes reconfiguring 620 the data connection using the third set of parameters. In certain embodiments, reconfiguring 620 the data connection includes performing one of: re-establishing the data connection using the third set of parameters, establishing a new data connection using a fourth set of parameters based on the second set of parameters, and releasing the data connection.

In some embodiments, reconfiguring 620 the data connection includes re-establishing the data connection using the third set of parameters. In one embodiment, re-establishing the data connection includes sending a NAS session management message, the NAS session management message containing the third set of parameters. The method 600 ends.

Figure 7:
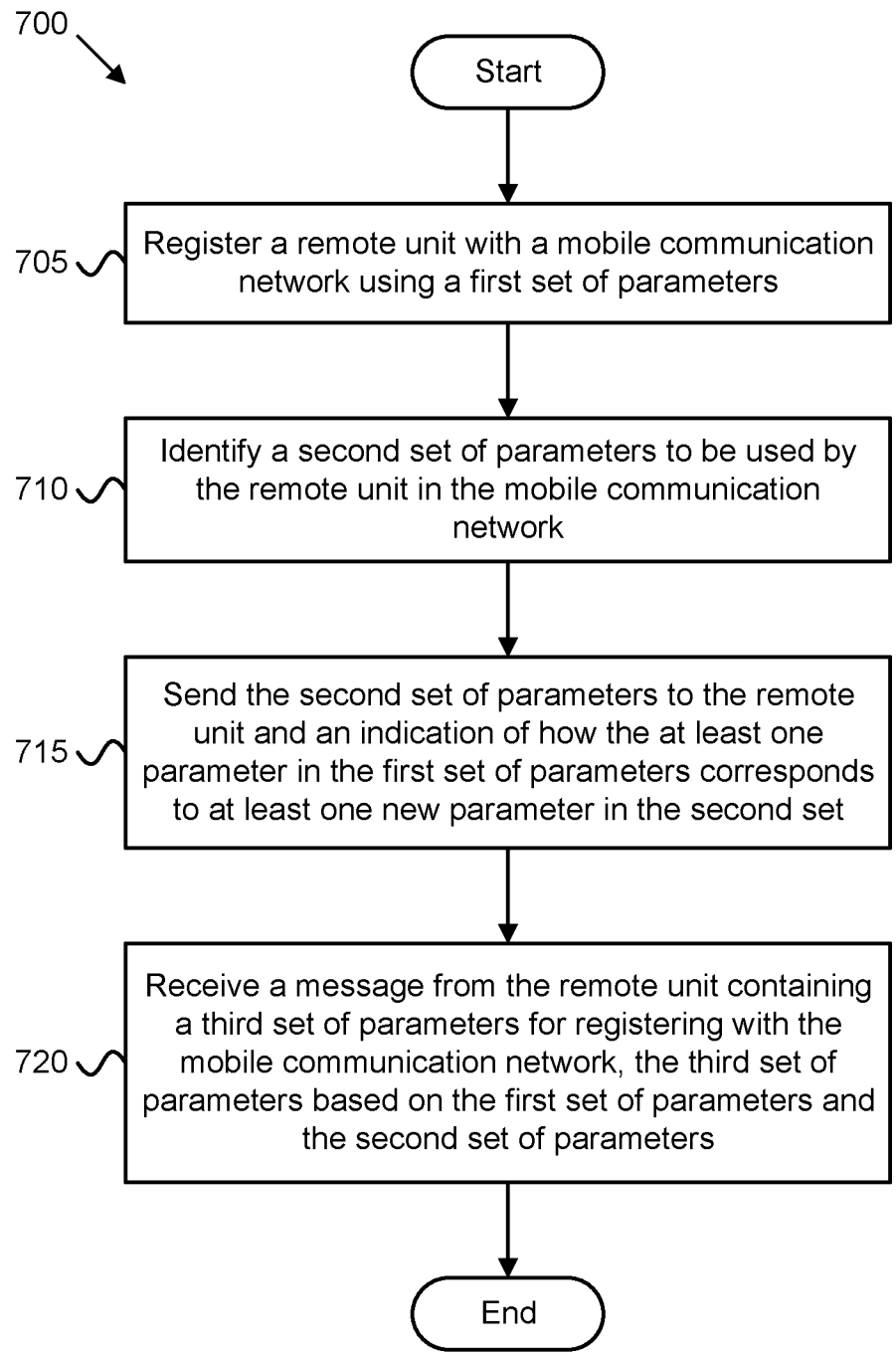
FIG. 7 is a flow diagram illustrating one embodiment of a method for re-registering a remote unit using new parameters.

FIG. 7 depicts a method 700 for re-registering a remote unit with new parameters, according to embodiments of the disclosure. In some embodiments, the method 700 is performed by an apparatus, such as the AMF 135 and/or network function apparatus 400. In certain embodiments, the method 700 may be performed by a processor executing program code, for example, a microcontroller, a microprocessor, a CPU, a GPU, an auxiliary processing unit, a FPGA, or the like.

The method 700 begins and registers 705 a remote unit with a mobile communication network using a first set of parameters. In some embodiments, registering 705 the remote unit includes receiving an initial registration message from the remote unit and returning an allowed set of network slice selection parameters to the remote unit. Here, the initial registration message contains a requested set of network slice selection parameters. In certain embodiments, the allowed set of network slice selection parameters includes one or more default network slice selection parameters. Further, returning the allowed set of network slice selection parameters may include sending an indication that a default network slice selection parameter corresponds to a data network name and/or a standardized network slice type.

The method includes identifying 710 a second set of parameters to be used by the remote unit in the mobile communication network. In one embodiment, identifying 710 the second set of parameters includes identifying the second set of parameters based on the requested set of network slice selection parameters, subscribed parameters of the remote unit, and/or a network slice instance associated with the remote unit. In another embodiment, identifying 710 the second set of parameters includes identifying the second set of parameters based on a configuration of the remote unit and a network slice instance currently associated with the remote unit.

In some embodiments, the first set of parameters includes a first network slice selection parameter and identifying 710 the second set of parameters includes identifying one or more new network slice selection parameters for a network slice instance currently associated with the remote unit. In some embodiments, identifying 710 the second set of parameters to be used by the remote unit in the mobile communication network includes sending a query to a network slice selection function in response to receiving a registration request from the remote unit and receiving, from the network slice selection function, a mapping of network slice selection parameters to network slice instances. Here, identifying 710 the second set of parameters further includes identifying a set of allowed network slice selection parameters based on a network slice instance currently associated with the remote unit.

In one embodiment, identifying 710 the second set of parameters includes receiving a registration request from the remote unit and determining that at least one parameter in a first set of parameters is no longer valid occurs in response to the registration request. In certain embodiments, the registration request is received in response to one of: the remote unit changing its registration area, the remote unit changing its PLMN change, and the remote unit requiring temporarily use a network slice. In another embodiment, identifying 710 the second set of parameters includes determining that at least one parameter in a first set of parameters is no longer valid in response to one of: a change in subscription of the remote unit, a change in network policy rule applicable to the remote unit, and a change in network slice deployment.

The method includes sending 715 a second set of parameters to the remote unit and an indication of how the at least one parameter in the first set of parameters corresponds to at least one new parameter in the second set. In one embodiment, sending 715 the indication of how the at least one parameter in the first set corresponds to at least one new parameter in the second set includes sending usage information that associates the one or more new network slice selection parameters with one or more previously provided network slice selection parameters. Here, the one or more previously provided network slice selection parameters may include the first network slice selection parameter. In certain embodiments, the usage information is sent in response to determining that the new parameter in the second set is not known to the remote unit.

In certain embodiments, sending 715 the second set of parameters and the indication of how the at least one parameter in the first set corresponds to at least one new parameter in the second set includes sending a registration accept message (e.g., a NAS Registration Accept message) that includes the second set of parameters and the indication of how the at least one parameter in the first set corresponds to at least one new parameter in the second set. In other embodiments, sending 715 the second set of parameters and the indication of how the at least one parameter in the first set corresponds to at least one new parameter in the second set includes sending one of: a configuration update message and a NAS notification message.

The method includes receiving 720 a message from the remote unit containing a third set of parameters for registering with the mobile communication network. Here, the third set of parameters is based on the first set of parameters and the second set of parameters. In some embodiments, receiving 720 the message from the remote unit includes receiving a session management ("SM") request message encapsulated in a NAS transport message. Here, the NAS transport message contains the third set of parameters and the session management message, with the SM request message including the at least one new parameter from the second set of parameters, such as a new network slice selection parameter.

In certain embodiments, identifying 710 the second set of parameters includes sending a SM request message to a SM function in response to determining that at least one parameter in the first set is no longer valid. Here, the SM request message includes an indication to release an established data connection and a new network slice selection parameter from the second set of parameters, such as a new network slice selection parameter. Sending the SM request message may include receiving an SM response message from the SM function, the SM response message containing a session release request message for the established data connection, and sending the session release request message to the remote unit. The method 700 ends.

Figure 8:
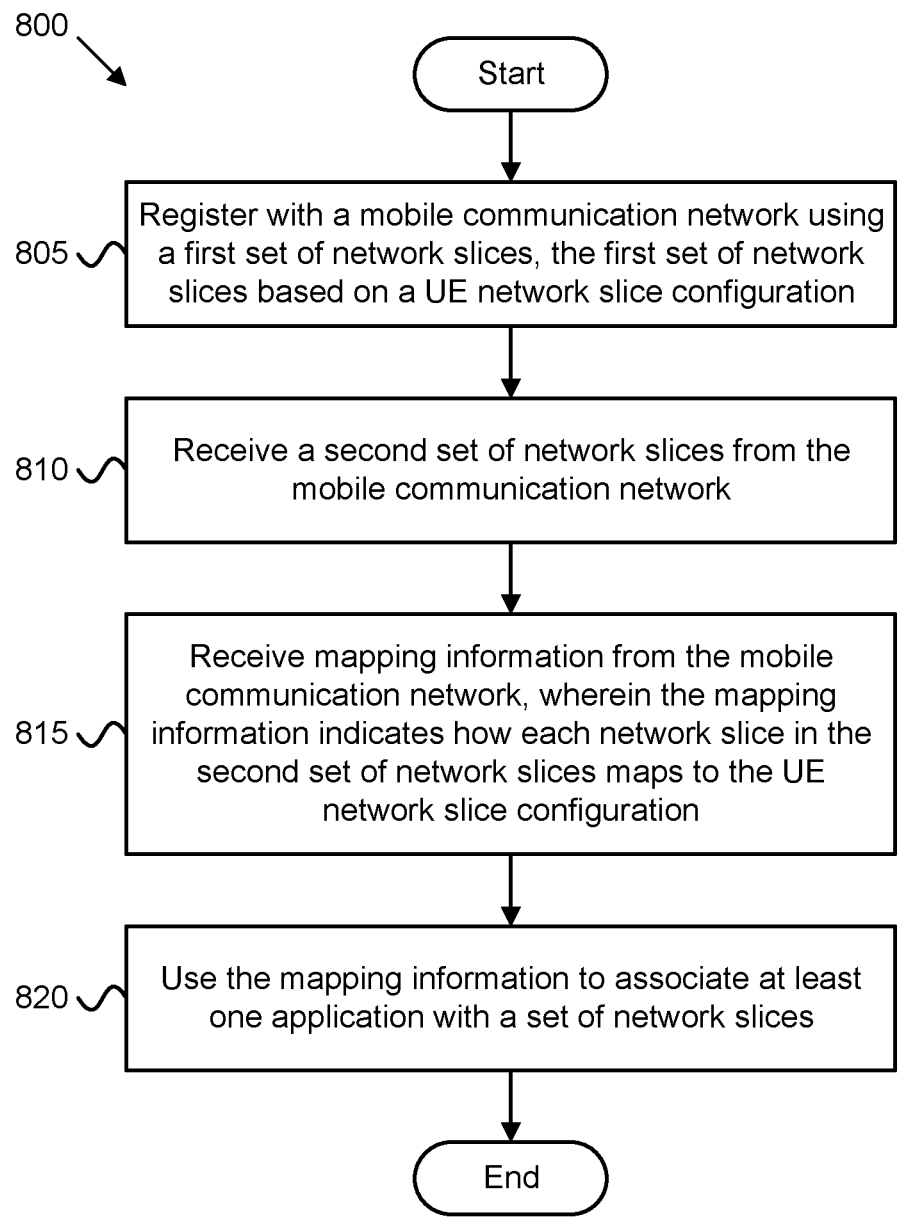
FIG. 8 is a flow diagram illustrating one embodiment of a second method reconfiguring a data connection using new parameters.

FIG. 8 depicts a method 800 for reconfiguring a data connection with new parameters, according to embodiments of the disclosure. In some embodiments, the method 800 is performed by an apparatus, such as the remote unit 105, the UE 205, and/or the remote apparatus 300. In certain embodiments, the method 800 may be performed by a processor executing program code, for example, a microcontroller, a microprocessor, a CPU, a GPU, an auxiliary processing unit, a FPGA, or the like.

The method 800 begins and registers 805 with the mobile communication network using a first set of network slices, the first set of network slices based on a UE network slice configuration. The method 800 receives 810 a second set of network slices from the mobile communication network. The method 800 receives 815 mapping information from the mobile communication network, wherein the mapping information indicates how each network slice in the second set of network slices maps to the UE network slice configuration.

The method 800 uses 820 the mapping information to associate at least one application with a set of network slices. The method 800 ends.

Figure 9:
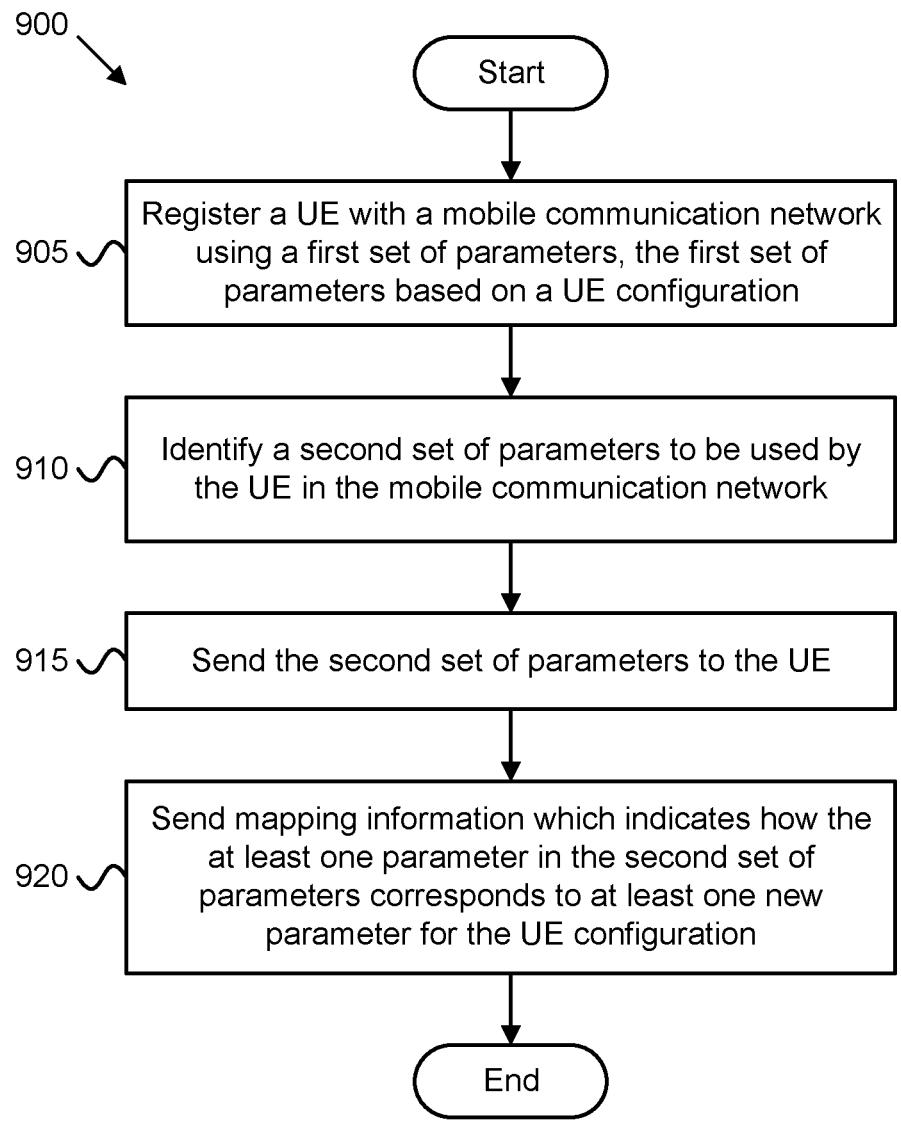
FIG. 9 is a flow diagram illustrating one embodiment of a third method for reconfiguring a data connection with new parameters.

FIG. 9 depicts a method 900 for reconfiguring a data connection with new parameters, according to embodiments of the disclosure. In some embodiments, the method 900 is performed by an apparatus, such as the AMF 135 and/or network function apparatus 400. In certain embodiments, the method 900 may be performed by a processor executing program code, for example, a microcontroller, a microprocessor, a CPU, a GPU, an auxiliary processing unit, a FPGA, or the like.

The method 900 begins and registers 905 a UE with a mobile communication network using a first set of parameters. The method 900 includes identifying 910 a second set of parameters to be used by the UE in the mobile communication network. The method 900 includes sending 915 a second set of parameters to the UE and an indication of how the at least one parameter in the first set of parameters corresponds to at least one new parameter in the second set. The method 900 includes receiving 920 a message from the UE containing a third set of parameters for registering with the mobile communication network, the third set of parameters based on the first set of parameters and the second set of parameters. The method 900 ends.

Disclosed herein is a first apparatus for reconfiguring a data connection using new parameters, according to embodiments of the disclosure. The first apparatus may be implemented by a network node, such as the AMF 135, and/or the network function apparatus 400, described above. The first apparatus includes a transceiver that communicates with a User Equipment ("UE") and a processor that registers the UE with a mobile communication network using a first set of parameters, the first set of parameters based on a UE configuration. The processor identifies a second set of parameters to be used by the UE in the mobile communication network, sends the second set of parameters to the UE, and sends mapping information to the UE, wherein the mapping information indicates how the at least one parameter in the second set of parameters corresponds to at least one new parameter for the UE configuration.

In some embodiments, the processor further receives an initial registration message from the UE, the initial registration message containing a requested set of network slice selection parameters. In such embodiments, the processor returns an allowed set of network slice selection parameters to the UE, where identifying the second set of parameters includes the processor identifying the second set of parameters based on the requested set of network slice selection parameters, subscribed parameters of the UE, and a network slice instance associated with the UE.

In some embodiments, the allowed set of network slice selection parameters includes one or more default network slice selection parameters. In such embodiments, the processor returns the allowed set of network slice selection parameters by sending an indication that a default network slice selection parameter corresponds to one of: a data network name and a standardized network slice type.

In some embodiments, identifying the second set of parameters includes identifying the second set of parameters based on a configuration of the UE and a network slice instance currently associated with the UE.

In some embodiments, the first set of parameters includes a first network slice selection parameter. In such embodiments, identifying the second set of parameters comprises identifying one or more new network slice selection parameters for a network slice instance currently associated with the UE.

In certain embodiments, the processor sends an indication of how the at least one parameter in the first set corresponds to at least one new parameter in the second set by sending usage information that associates the one or more new network slice selection parameters with one or more previously provided network slice selection parameters or with one or more standardized network slice types. Here, the one or more previously provided network slice selection parameters includes the first network slice selection parameter.

In further embodiments, the first method includes determining that the second set of parameters includes one or more new network slice selection parameters not known to the UE. In such embodiments, sending the usage information occurs in response to determining that the second set of parameters includes one or more new network slice selection parameters.

In some embodiments, the processor further receives a registration request from the UE and determines that at least one parameter in a first set of parameters is no longer valid in response to the registration request. In such embodiments, the processor sends the second set of parameters and the indication of how the at least one parameter in the first set corresponds to at least one new parameter in the second set by sending a registration accept message that includes the second set of parameters and the indication of how the at least one parameter in the first set corresponds to at least one new parameter in the second set.

In certain embodiments, the processor receives the registration request in response to one of: the UE changing its registration area, the UE changing its public land mobile network ("PLMN") change, and the UE requiring temporarily use a network slice.

In some embodiments, the processor further determines that at least one parameter in a first set of parameters is no longer valid in response to one of: a change in subscription of the UE, a change in network policy rule applicable to the UE, and a change in network slice deployment.

In some embodiments, sending the second set of parameters and the indication of how the at least one parameter in the first set corresponds to at least one new parameter in the second set includes sending one of: a non-access stratum ("NAS") UE configuration update message and a NAS notification message that includes the second set of parameters and the indication of how the at least one parameter in the first set corresponds to at least one new parameter in the second set.

In some embodiments, receiving the request message from the UE includes receiving a non-access stratum ("NAS") message that contains a set of parameters based on the second set of parameters and the mapping information.

In certain embodiments, the processor sends a SM request message to a SM function in response to determining that at least one parameter in the first set is no longer valid. In such embodiments, the SM request message includes an indication to release an established data connection and a new network slice selection parameter from the second set of parameters, where the at least one new parameter from the second set of parameters included in the session management message includes the new network slice selection parameter.

In certain embodiments, the processor receives an SM response message from the SM function, the SM response message containing a session release request message for the established data connection. In certain embodiments, the processor sends the session release request message to the UE.

In some embodiments, identifying the second set of parameters to be used by the UE in the mobile communication network includes sending a query to a network slice selection function in response to receiving a registration request from the UE and receiving, from the network slice selection function, a mapping of network slice selection parameters to network slice instances. In certain embodiments, identifying the second set of parameters further comprises identifying a set of allowed network slice selection parameters based on a network slice instance currently associated with the UE.

In some embodiments, the first set of parameters comprises a first set of Single Network Slice Selection Assistance Information values ("S-NSSAIs") that are derived from the UE configuration.

In some embodiments, the transceiver receives a request message from the UE to establish a data connection for an application using the second set of parameters and the mapping information.

Disclosed herein is a first method for reconfiguring a data connection using new parameters, according to embodiments of the disclosure. The first apparatus may be implemented by a network function, such as the AMF 135 and/or the network function apparatus 400, described above. The first method includes registering a UE with a mobile communication network using a first set of parameters, where the first set of parameters is based on a UE configuration. The first method includes identifying a second set of parameters to be used by the UE in the mobile communication network and sending the second set of parameters to the UE. The first method includes sending mapping information which indicates how the at least one parameter in the second set of parameters corresponds to at least one new parameter for the UE configuration.

In some embodiments, the first method further includes receiving an initial registration message from the UE, the initial registration message containing a requested set of network slice selection parameters, and returning an allowed set of network slice selection parameters to the UE. In such embodiments, identifying the second set of parameters includes identifying the second set of parameters based on: the requested set of network slice selection parameters, subscribed parameters of the UE, and a network slice instance associated with the UE.

In certain embodiments, the allowed set of network slice selection parameters includes one or more default network slice selection parameters. In such embodiments, returning the allowed set of network slice selection parameters includes sending an indication that a default network slice selection parameter corresponds to one of: a data network name and a standardized network slice type.

In some embodiments, identifying the second set of parameters includes identifying the second set of parameters based on a configuration of the UE and a network slice instance currently associated with the UE.

In some embodiments, the first set of parameters includes a first network slice selection parameter. In such embodiments, identifying the second set of parameters includes identifying one or more new network slice selection parameters for a network slice instance currently associated with the UE.

In certain embodiments, sending an indication of how the at least one parameter in the first set corresponds to at least one new parameter in the second set includes sending usage information that associates the one or more new network slice selection parameters with one or more previously provided network slice selection parameters or with one or more standardized network slice types. Here, the one or more previously provided network slice selection parameters includes the first network slice selection parameter.

In certain embodiments, the first method includes determining that the second set of parameters includes one or more new network slice selection parameters not known to the UE. In such embodiments, sending the usage information occurs in response to determining that the second set of parameters includes one or more new network slice selection parameters.

In some embodiments, the first method includes receiving a registration request from the UE and determining that at least one parameter in a first set of parameters is no longer valid in response to the registration request. In such embodiments, sending the second set of parameters and the indication of how the at least one parameter in the first set corresponds to at least one new parameter in the second set includes sending a registration accept message that includes the second set of parameters and the indication of how the at least one parameter in the first set corresponds to at least one new parameter in the second set.

In certain embodiments, the first method includes receiving the registration request in response to one of: the UE changing its registration area, the UE changing its public land mobile network ("PLMN") change, and the UE requiring temporarily use a network slice.

In some embodiments, the first method includes determining that at least one parameter in a first set of parameters is no longer valid in response to one of: a change in subscription of the UE, a change in network policy rule applicable to the UE, and a change in network slice deployment.

In some embodiments, sending the second set of parameters and the indication of how the at least one parameter in the first set corresponds to at least one new parameter in the second set includes sending one of: a non-access stratum ("NAS") UE configuration update message and a NAS notification message that includes the second set of parameters and the indication of how the at least one parameter in the first set corresponds to at least one new parameter in the second set.

In some embodiments, receiving the request message from the UE comprises receiving a non-access stratum ("NAS") message, the NAS message containing a set of parameters based on the second set of parameters and the mapping information.

In certain embodiments, the first method includes sending a SM request message to a SM function in response to determining that at least one parameter in the first set is no longer valid. In such embodiments, the SM request message includes an indication to release an established data connection and a new network slice selection parameter from the second set of parameters. Here, the at least one new parameter from the second set of parameters included in the session management message includes the new network slice selection parameter.

In certain embodiments, the first method further includes receiving an SM response message from the SM function, the SM response message containing a session release request message for the established data connection. In further embodiments, the first method includes sending the session release request message to the UE.

In some embodiments, identifying the second set of parameters to be used by the UE in the mobile communication network includes sending a query to a network slice selection function in response to receiving a registration request from the UE. In such embodiments, the first method may include receiving, from the network slice selection function, a mapping of network slice selection parameters to network slice instances. In such embodiments, identifying the second set of parameters further includes identifying a set of allowed network slice selection parameters based on a network slice instance currently associated with the UE.

In some embodiments, the first set of parameters comprises a first set of Single Network Slice Selection Assistance Information values ("S-NSSAIs") that are derived from the UE configuration.

In some embodiments, the first method includes receiving a request message from the UE to establish a data connection for an application using the second set of parameters and the mapping information.

Disclosed herein is a second apparatus for performing communication activity with more than one USIM, according to embodiments of the disclosure. The second apparatus may be implemented by a UE device, such as the remote unit 105, the UE 205, and/or the remote apparatus 800, described above, described above. The second apparatus includes a transceiver that communicates with a mobile communication network and a processor that registers with the mobile communication network using a first set of network slices, the first set of network slices based on a UE network slice configuration. Via the transceiver, the processor receives a second set of network slices from the mobile communication network and also receives mapping information from the mobile communication network. Here, the mapping information indicates how each network slice in the second set of network slices maps to the UE network slice configuration. The processor uses the mapping information to associate at least one application with a set of network slices.

Disclosed herein is a second method for performing communication activity with more than one USIM, according to embodiments of the disclosure. The second method may be performed by a UE device, such as the remote unit 105, the UE 205, and/or the remote apparatus 800, described above. The second method includes registering with a mobile communication network using a first set of network slices, the first set of network slices based on a UE network slice configuration, and receiving a second set of network slices from the mobile communication network. The method includes receiving mapping information from the mobile communication network, where the mapping information indicates how each network slice in the second set of network slices maps to the UE network slice configuration, and using the mapping information to associate at least one application with a set of network slices.

Disclosed herein is a third apparatus for performing communication activity with more than one USIM, according to embodiments of the disclosure. The third apparatus may be implemented by a UE device, such as the AMF 135 and/or the network function apparatus 400, described above, described above. The third apparatus includes a processor and a transceiver (e.g., supporting a network interface) which receives a registration request from a UE, where the UE registers with a mobile communication network using a first set of network slices, the first set of network slices based on a UE network slice configuration. The processor identifies a second set of network slices for the UE. Via the transceiver, the processor sends the second set of network slices to the UE and also sends mapping information to the UE, where the mapping information indicates how each network slice in the second set of network slices maps to the UE network slice configuration.

Disclosed herein is a third method for performing communication activity with more than one USIM, according to embodiments of the disclosure. The third method may be performed by a network function in a mobile communication network, such as the AMF 135 and/or the network function apparatus 400, described above. The third method includes receiving a registration request from a UE, where the UE registers with the mobile communication network using a first set of network slices, the first set of network slices based on a UE network slice configuration. The third method includes determining a second set of network slices for the UE and sending the second set of network slices to the UE. The third method includes sending mapping information to the UE, where the mapping information indicates how each network slice in the second set of network slices maps to the UE network slice configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network function apparatus comprising:
a processor; and
a memory coupled with the processor, the memory comprising instructions executable by the processor to cause the apparatus to:
receive, from a user equipment ("UE"), a registration request indicating a first set of network slices;
determine a second set of network slices based at least in part on the first set of network slices;
determine mapping information indicating a mapping between at least one network slice of the second set of network slices to at least one network slice of a home public land mobile network ("HPLMN"); and
output, to the UE, the second set of network slices and the mapping information.

2. The apparatus of claim 1, wherein the first set of network slices comprises a requested set of network slice selection parameters, wherein the second set of network slices comprises an allowed set of network slice selection parameters.

3. The apparatus of claim 1, wherein the instructions are further executable by the processor to cause the apparatus to determine the second set of network slices based on at least one of: a requested set of network slice selection parameters, a set of subscribed network slices of the UE, a network slice available in a serving network in a current tracking area of the UE, or a combination thereof.

4. The apparatus of claim 1, wherein the second set of network slices comprises one or more network slices available in a serving network and absent from a set of subscribed network slices of the UE.

5. The apparatus of claim 4, wherein the mapping information comprises a mapping of a network slice from the second set of network slices to a network slice from the set of subscribed network slices.

6. The apparatus of claim 4, wherein the mapping information associates the second set of network slices with one or more previously provided network slice selection parameters corresponding to the first set of network slices or with one or more standardized network slice types.

7. The apparatus of claim 6, wherein the instructions are further executable by the processor to cause the apparatus to:
determine that the second set of network slices corresponds to one or more new network slice selection parameters not known to the UE; and
determine to output to the UE the mapping information together with the second set of network slices in response to the second set of network slices corresponding to the one or more new network slice selection parameters.

8. The apparatus of claim 1, wherein the instructions are further executable by the processor to cause the apparatus to determine that at least one network slice in a first set of network slices is an invalid network slice of the UE in response to the registration request, wherein to output the second set of network slices and the mapping information, the instructions are further executable by the processor to cause the apparatus to transmit a registration accept message that indicates the second set of network slices and the mapping information.

9. The apparatus of claim 8, wherein the registration request indicates one or more of: a change in a registration area associated with the UE, a change in a public land mobile network ("PLMN") associated with the UE, a requirement of the UE for temporary use a network slice, or a combination thereof.

10. The apparatus of claim 1, wherein the instructions are further executable by the processor to cause the apparatus to determine that at least one network slice parameter associated with the first set of network slices is invalid in response to one of: a change in subscription of the UE, a change in network policy rule applicable to the UE, a change in network slice deployment, or a combination thereof.

11. The apparatus of claim 1, wherein to output the second set of network slices and the mapping information, the instructions are further executable by the processor to cause the apparatus to transmit a non-access stratum ("NAS") UE configuration update message that indicates the second set of network slices and the mapping information or a NAS notification message that indicates the second set of network slices and the mapping information.

12. The apparatus of claim 1, wherein the instructions are further executable by the processor to cause the apparatus to receive, from the UE, a connection request message to establish a data connection for an application using the second set of network slices and the mapping information.

13. The apparatus of claim 12, wherein the connection request message comprises a non-access stratum ("NAS") message comprising a set of network slices based on the second set of network slices and the mapping information.

14. The apparatus of claim 13, wherein the instructions are further executable by the processor to cause the apparatus to transmit a session management ("SM") request message to a SM function in response to at least one network slice in the first set of network slices being invalid, wherein the SM request message includes an indication to release an established data connection and a new network slice selection parameter from the second set of network slices.

15. The apparatus of claim 14, wherein the instructions are further executable by the processor to cause the apparatus to:
receive, from the SM function, an SM response message comprising a session release request message for the established data connection; and
transmit the session release request message to the UE.

16. The apparatus of claim 1, wherein to determine the second set of network slices, the instructions are further executable by the processor to cause the apparatus to:
transmit a query to a network slice selection function in response to receiving a registration request;
receive, from the network slice selection function, a mapping of network slice selection parameters to network slice instances; and
determine a set of allowed network slice selection parameters based on a network slice instance currently associated with the UE.

17. The apparatus of claim 1, wherein the first set of network slices comprises a first set of Single Network Slice Selection Assistance Information values ("S-NSSAIs") based on a configuration of the UE.

18. A method of a network node, the method comprising:
receiving, from a user equipment ("UE") a registration request indicating a first set of network slices;
determining a second set of network slices based at least in part on the first set of network slices;
determining mapping information indicating a mapping between at least one network slice of the second set of network slices to at least one network slice of a home public land mobile network ("HPLMN"); and
outputting, to the UE, the second set of network slices and the mapping information.

19. The method of claim 18, wherein the first set of network slices comprises a requested set of network slice selection parameters, wherein the second set of network slices comprises an allowed set of network slice selection parameters.

20. A User Equipment ("UE") apparatus comprising:
a processor; and
a memory coupled with the processor, the memory comprising instructions executable by the processor to cause the apparatus to:
transmit a registration request indicating a first set of network slices;
receive a second set of network slices;
receive mapping information indicating a mapping between at least one network slice of the first set of network slices or the second set of network slices to at least one network slice of a home public land mobile network ("HPLMN"); and
associate at least one application with the at least one network slices of the first set of network slices or the second set of network slices based at least in part on the mapping information.

* * * * *